(12) United States Patent
Barbieri et al.

(10) Patent No.: US 9,544,115 B2
(45) Date of Patent: Jan. 10, 2017

(54) APPARATUS AND METHOD OF IMPROVING IDENTIFICATION OF REFERENCE SIGNAL TRANSMISSIONS

(71) Applicant: QUALCOMM Incorporated, San Diego, CA (US)

(72) Inventors: Alan Barbieri, San Diego, CA (US); Milos Jorgovanovic, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 14/253,665

(22) Filed: Apr. 15, 2014

(65) Prior Publication Data

US 2015/0049683 A1  Feb. 19, 2015

Related U.S. Application Data

(60) Provisional application No. 61/867,529, filed on Aug. 19, 2013.

(51) Int. Cl.
*H04L 5/00* (2006.01)

(52) U.S. Cl.
CPC ............. *H04L 5/005* (2013.01); *H04L 5/0073* (2013.01); *H04L 5/0007* (2013.01); *H04L 5/0035* (2013.01)

(58) Field of Classification Search
None
See application file for complete search history.

(56) References Cited

U.S. PATENT DOCUMENTS

| 2010/0008293 | A1* | 1/2010 | Gupta | H04W 92/20 370/328 |
| 2010/0323684 | A1* | 12/2010 | Cai | H04B 7/2606 455/422.1 |
| 2011/0149774 | A1* | 6/2011 | Chen | H04L 1/1854 370/252 |
| 2012/0082052 | A1* | 4/2012 | Oteri | H04W 24/10 370/252 |
| 2012/0087250 | A1* | 4/2012 | Song | H04W 24/02 370/242 |

(Continued)

FOREIGN PATENT DOCUMENTS

| EP | 2073417 | * | 6/2009 | ............... H04L 1/00 |
| WO | WO 2009/022876 | * | 2/2009 | ............... H04B 7/04 |

(Continued)

OTHER PUBLICATIONS

Reference signal design for coordinated multipoint trnasmission in LTE-Advanced; Koivisto et al. IEEE xplorer; 2011.*

(Continued)

*Primary Examiner* — Jay P Patel
(74) *Attorney, Agent, or Firm* — Arent Fox LLP

(57) ABSTRACT

Methods and apparatuses are described for improving identification of reference signal transmissions at a user equipment (UE). One or more restrictions related to reference signal transmissions in one or more interfering signals can be identified. One or more reference signal transmissions received in the one or more interfering signals can then be detected based at least in part on the one or more restrictions. The one or more reference signal transmissions received in the one or more interfering signals can be processed to improve communications with a serving base station.

30 Claims, 14 Drawing Sheets

(56) References Cited

U.S. PATENT DOCUMENTS

| | | | |
|---|---|---|---|
| 2012/0220327 A1* | 8/2012 | Lee | H04W 72/1273 455/509 |
| 2013/0034071 A1* | 2/2013 | Lee | H04W 72/042 370/329 |
| 2013/0070634 A1 | 3/2013 | Gao et al. | |
| 2013/0250782 A1* | 9/2013 | Nimbalker | H04L 1/203 370/252 |
| 2013/0252606 A1* | 9/2013 | Nimbalker | H04B 17/309 455/434 |
| 2013/0322376 A1* | 12/2013 | Marinier | H04W 72/06 370/329 |
| 2014/0003250 A1* | 1/2014 | Seo | H04W 36/0083 370/241 |
| 2014/0098689 A1* | 4/2014 | Lee | H04B 7/0469 370/252 |
| 2015/0036612 A1* | 2/2015 | Kim | H04B 17/00 370/329 |
| 2015/0049689 A1* | 2/2015 | Seo | H04L 5/005 370/329 |
| 2015/0304997 A1* | 10/2015 | Park | H04B 7/024 370/330 |
| 2015/0318954 A1* | 11/2015 | Park | H04W 24/10 370/252 |
| 2015/0327281 A1* | 11/2015 | Seo | H04J 11/004 370/329 |
| 2015/0341877 A1* | 11/2015 | Yi | H04W 56/00 370/350 |
| 2016/0128033 A1* | 5/2016 | Larsson | H04W 28/20 370/329 |

FOREIGN PATENT DOCUMENTS

| | | | | |
|---|---|---|---|---|
| WO | WO 2013/064897 | * | 5/2013 | H04J 11/00 |
| WO | WO-2013/064897 A1 | | 5/2013 | |

OTHER PUBLICATIONS

Dahlman Erik et al., "4G LTE/LTE-Advanced for Mobile Broadband—Chapter 10", Mar. 29, 2011, pp. 145-202, XP055046016.
International Search Report and Written Opinion—PCT/US2014/050926—ISA/EPO—Oct. 28, 2014 (13 total pages).

* cited by examiner

APPARATUS AND METHOD OF IMPROVING IDENTIFICATION OF REFERENCE SIGNAL TRANSMISSIONS

CLAIM OF PRIORITY UNDER 35 U.S.C. §119

The present application claims priority to Provisional Application No. 61/867,529, entitled "APPARATUS AND METHOD OF IMPROVING IDENTIFICATION OF CHANNEL STATE INFORMATION REFERENCE SIGNAL (CSI-RS) TRANSMISSIONS," filed Aug. 19, 2013, the entirety of which is incorporated by reference herein.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

The identification of reference signal transmissions (e.g., channel state information reference signals (CSI-RS), which may be used for channel state feedback purposes, may be difficult due to lack of related information (for example, sub-frame configuration, resource configuration, virtual cell identities (VCID), number of antenna ports, etc.) at a user equipment (UE). Therefore, the UE currently performs blind CSI-RS detection for identifying the CSI-RS transmissions from the non-serving cells. Thus, there is a desire for an improved identification of CSI-RS transmissions from non-serving cells at a UE.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with improving identification of reference signal transmissions, such as channel state information-reference signal (CSI-RS) transmissions, which may be present in interfering signals received by a communication device (e.g., a user equipment (UE)). These interfering signals may originate from the serving base station, which may be transmitting in multiple MIMO layers, or from non-serving base stations. In one example, the communications device (e.g., a UE) is equipped to identify one or more restrictions related to identifying reference signal transmissions. The UE can detect one or more reference signal transmissions in the interfering signals based at least in part on the one or more identified restrictions and can process the reference signals for one or more purposes.

According to related aspects, a method for improving identification of reference signal transmissions at a UE is provided. The method includes identifying one or more restrictions related to reference signal transmissions in one or more interfering signals. Based at least in part on the one or more restrictions, the one or more reference signal transmissions can be detected within the interfering signals. The UE may then process the one or more reference signal transmissions to improve communications with a serving base station.

In another example, an apparatus for improving identification of reference signal transmissions at a UE is provided. The apparatus includes a memory and at least one processor coupled to the memory, and configured to perform various functions. The functions can include identifying one or more restrictions related to reference signal transmissions in one or more interfering signals. The at least one processor is also configured to detect, based at least in part on the one or more restrictions, one or more reference signal transmissions received in the one or more interfering signals. Moreover, the at least one processor is configured to process the one or more reference signal transmissions received for the one or more non-serving cells to improve communications with a serving base station.

In a further example, an apparatus for improving identification of reference signal transmissions at a UE is provided. The apparatus includes means for identifying one or more restrictions related to reference signal transmissions in one or more interfering signals. Using the one or more restrictions, the apparatus also include means for detecting one or more reference signal transmissions received in the one or more interfering signals. Moreover, the apparatus includes means for processing the one or more reference signal transmissions received in the one or more interfering signals to improve communications with a serving base station.

In yet another example, a computer program product, stored on a non-transitory computer readable medium, for improving identification of reference signal transmissions at a UE is provided. The computer program product comprises code for causing at least one computer to identify one or more restrictions related to reference signal transmissions in one or more interfering signals. The computer program product also includes code for causing the at least one computer to detect, based at least in part on the one or more restrictions, one or more reference signal transmissions received in the one or more interfering signals. Based on detecting the reference signal transmissions, code for causing the at least one computer to process the one or more reference signal transmissions received in the one or more interfering signals is also included in the computer program product to improve communications with a serving base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
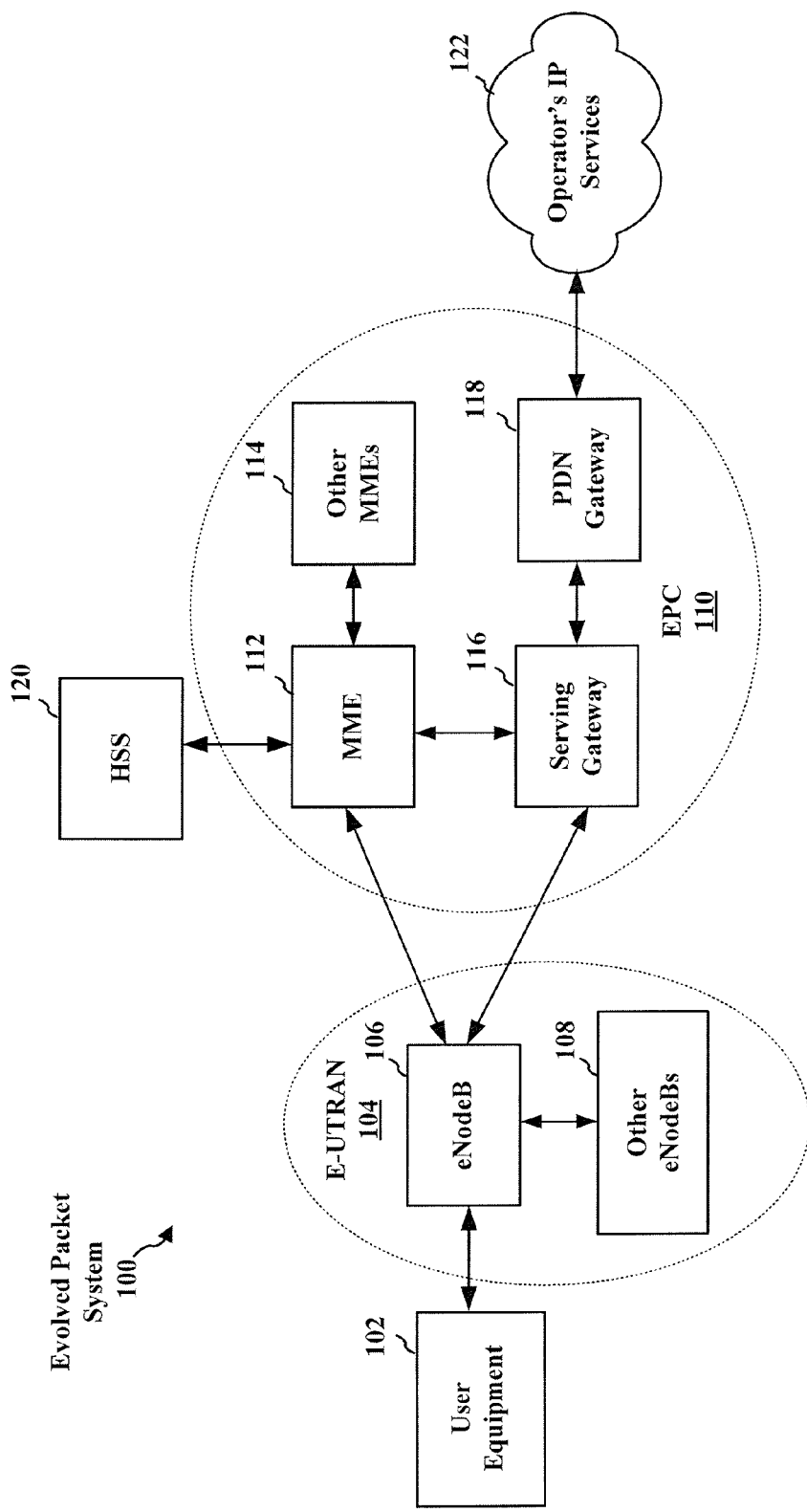
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating LTE network architecture. The LTE network architecture may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

UE 102 can also include an apparatus 1002 described in connection with FIG. 10 below, which includes various components for detecting one or more transmissions from other eNBs 108 based on one or more restrictions of the transmissions (e.g., to improve communications with eNB 106). In addition, for example, other eNBs 108 can include an apparatus 1202 described in connection with FIG. 12 below, which includes various components for transmitting signals according to one or more restrictions to improve detectability of the signals at UE 102. Moreover, for example, the restricted transmissions can refer to reference signals, such as channel state information reference signals (CSI-RS), as described herein.

Figure 2:
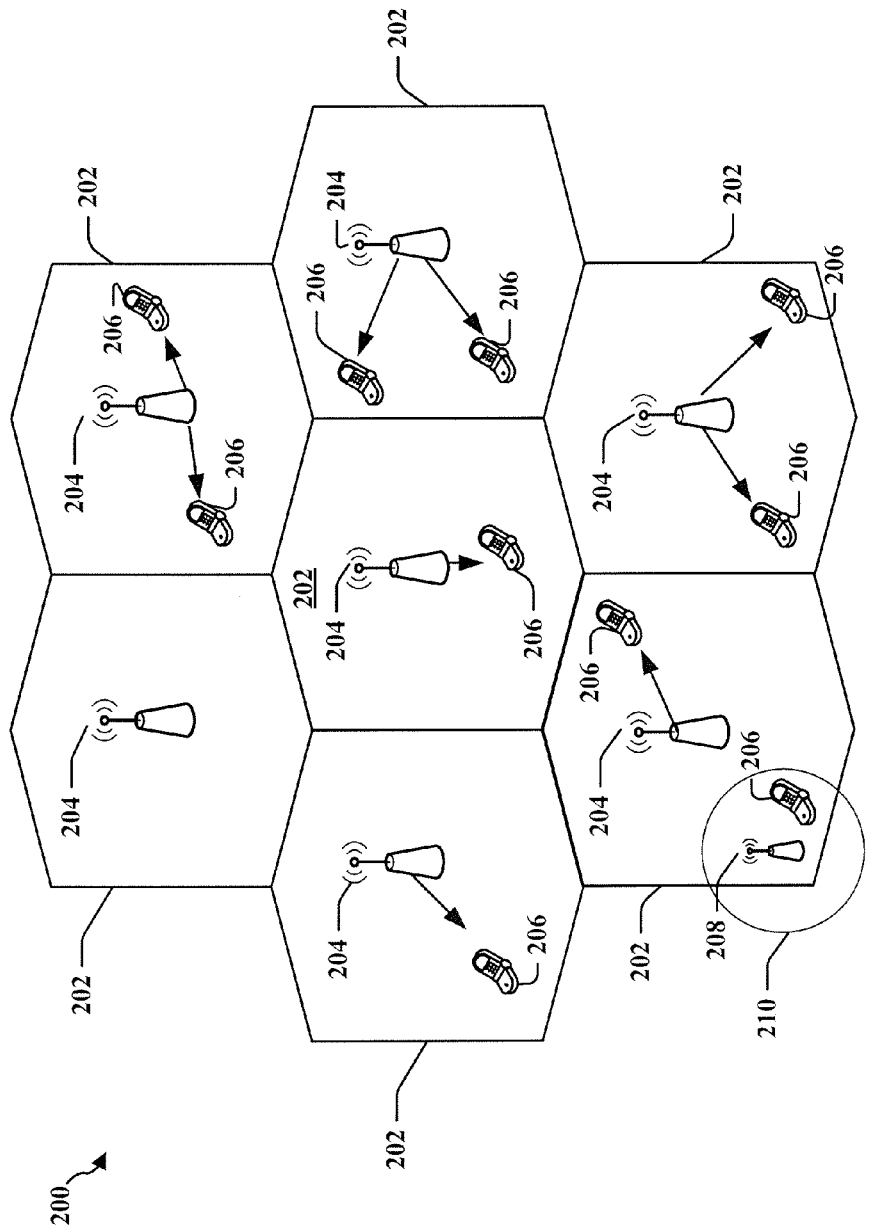
FIG. 2 is a diagram illustrating an example of an access network.

FIG. 2 is a diagram illustrating an example of an access network 200 in LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a small cell (e.g., femto cell, such as a home eNB (HeNB), pico cell, micro cell, or remote radio head (RRH), etc.). As such, as used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell. Further, macro cell base station 104 and small cell base station 106 are also connected to a radio network controller (RNC) or other network component (not shown) of a wireless network to facilitate providing UEs with access to the wireless network.

The macro eNBs 204 are each assigned to a respective cell 202 and are configured to provide an access point to the EPC 110 for all the UEs 206 in the cells 202. There is no centralized controller depicted in this example of an access network 200, but a centralized controller may be used in alternative configurations. The eNBs 204 are responsible for all radio related functions including radio bearer control, admission control, mobility control, scheduling, security, and connectivity to the serving gateway 116. Moreover, for example, UEs 206 can include UE 102 or apparatus 1002 that includes various components for detecting signal transmissions based on one or more restrictions used by a eNB in transmitting the signals. eNBs 204 can include other eNBs 108 or apparatus 1202 that includes components for transmitting signals according to one or more restrictions to enhance detectability thereof.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs to increase overall system capacity. This is achieved by spatially pre-coding each data stream (i.e., applying a scaling of amplitude and phase) and then transmitting each spatially pre-coded stream through multiple transmit antennas on the DL. The spatially pre-coded data streams arrive at the UE(s) 206 with different spatial signatures, which enables each of the UE(s) 206 to recover the one or more data streams destined for that UE 206. On the UL, each UE 206 transmits a spatially pre-coded data stream, which enables the eNB 204 to identify the source of each spatially pre-coded data stream.

Spatial multiplexing is generally used when channel conditions are good. When channel conditions are less favorable, beamforming may be used to focus the transmission energy in one or more directions. This may be achieved by spatially pre-coding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
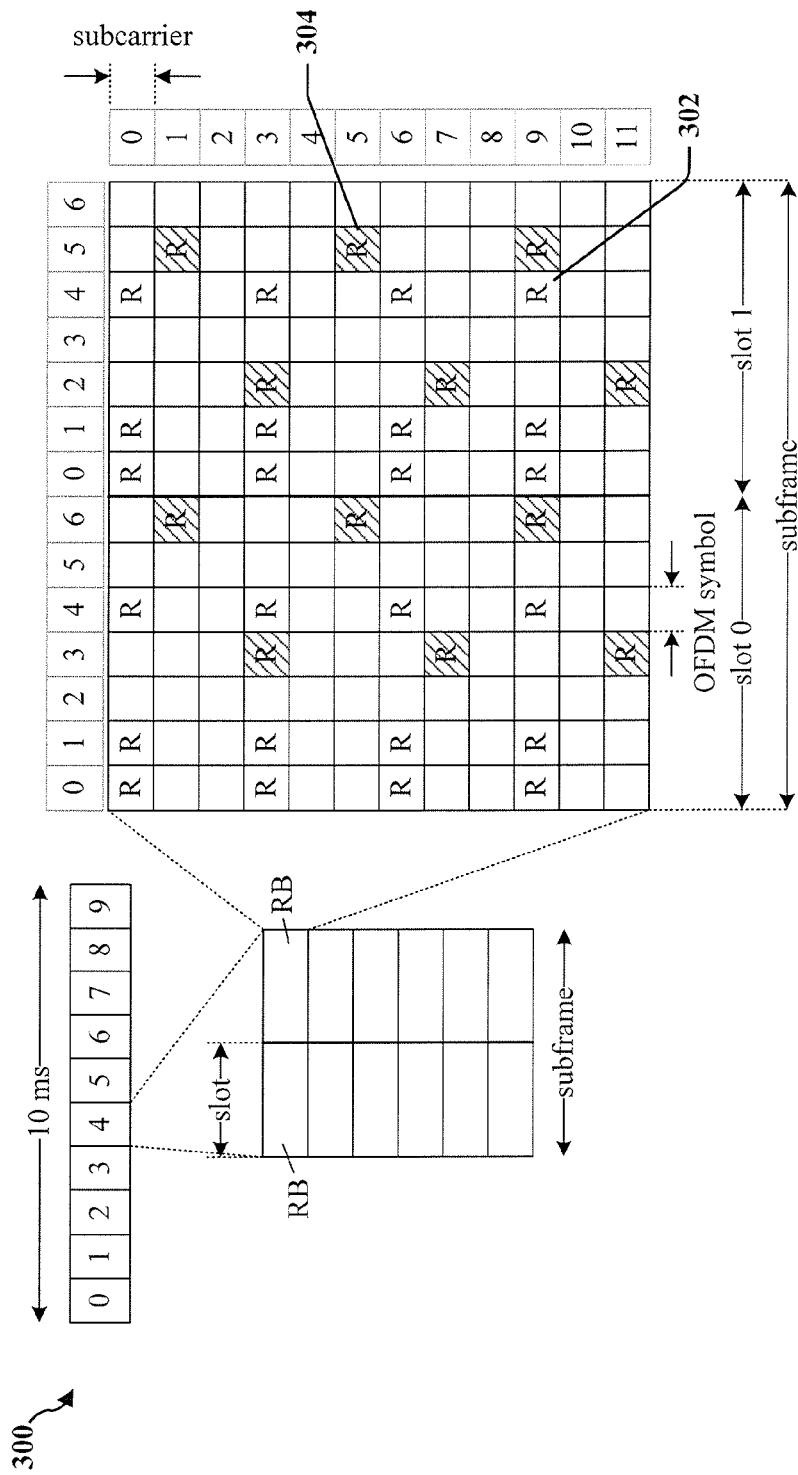
FIG. 3 is a diagram illustrating an example of a downlink (DL) frame structure in third generation partnership project (3GPP) long term evolution (LTE).

FIG. 3 is a diagram 300 illustrating an example of a DL frame structure in LTE. For example, a UE, such as UE 102 or apparatus 1002, and/or eNB, such as eNB 106, other eNBs 108, or apparatus 1202, as described herein, can use the frame structures described herein in communicating in a wireless network. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain, resulting in a total of 72 resource elements. Some of the resource elements, as indicated as R 302, 304, include DL reference signals (DL-RS). The DL-RS include Cell-specific RS (CRS) (also sometimes called common RS) 302, such as CSI-RS, and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
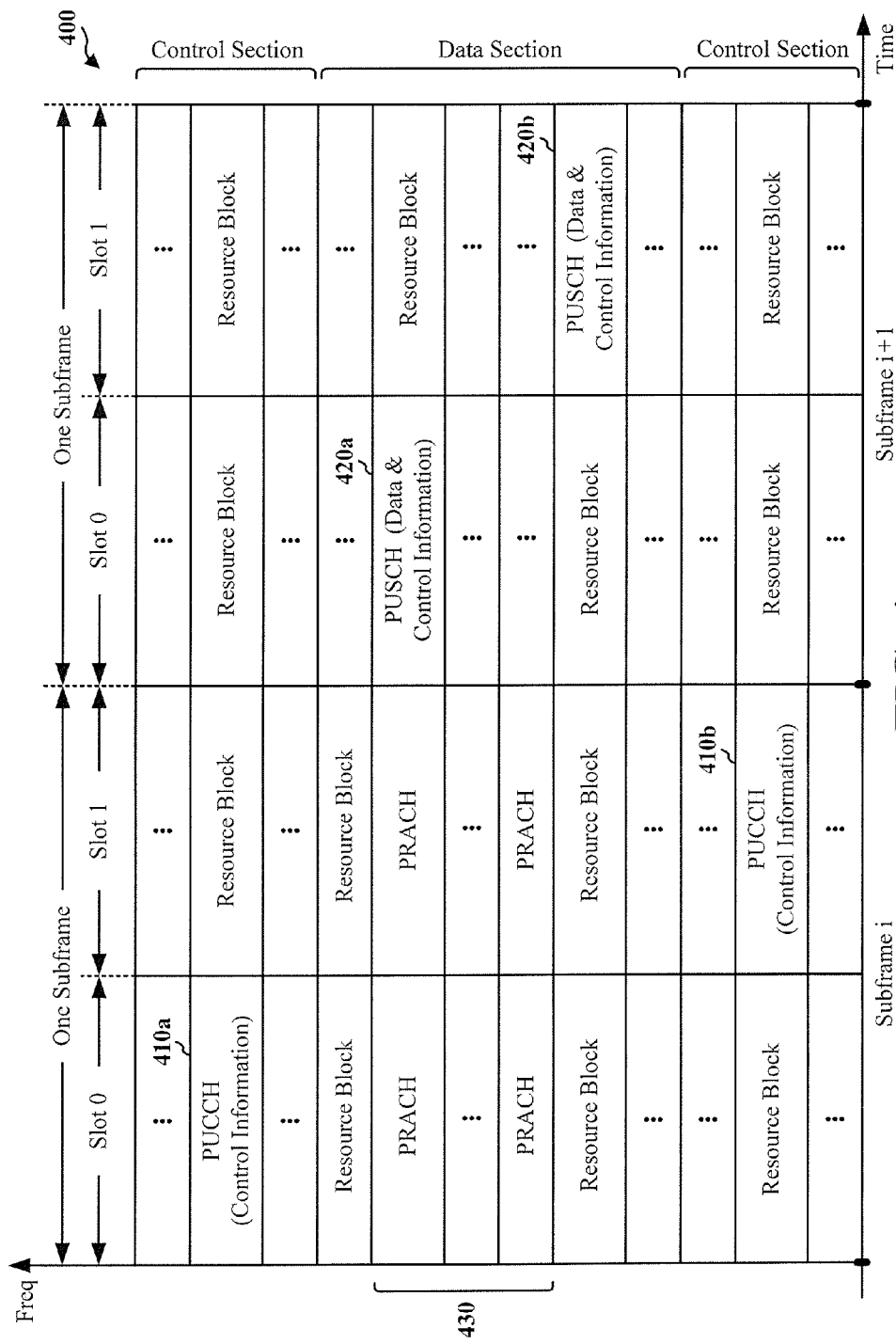
FIG. 4 is a diagram illustrating an example of an uplink (UL) frame structure in LTE.

FIG. 4 is a diagram 400 illustrating an example of an UL frame structure in LTE. For example, a UE, such as UE 102 or apparatus 1002, and/or eNB, such as eNB 106, other eNBs 108, or apparatus 1202, as described herein, can use the frame structures described herein in communicating in a wireless network. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single sub-frame (1 ms) or in a sequence of few contiguous sub-frames and a UE can make only a single PRACH attempt per frame (10 ms).

Figure 5:
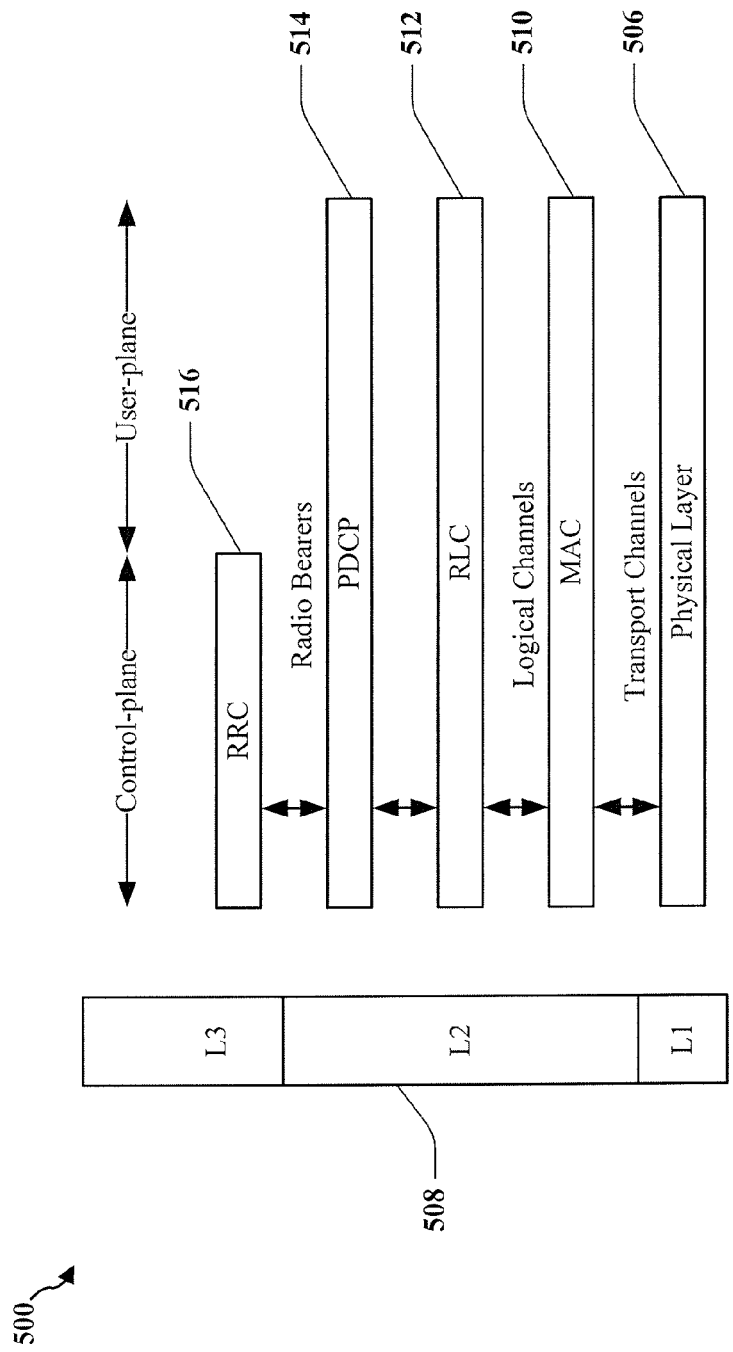
FIG. 5 is a diagram illustrating an example of a radio protocol architecture for the user and control planes.

FIG. 5 is a diagram 500 illustrating an example of a radio protocol architecture for the user and control planes in LTE. For example, a UE, such as UE 102 or apparatus 1002, and/or eNB, such as eNB 106, other eNBs 108, or apparatus 1202, as described herein, can use the radio protocol architecture described herein in communicating in a wireless network. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks)

in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
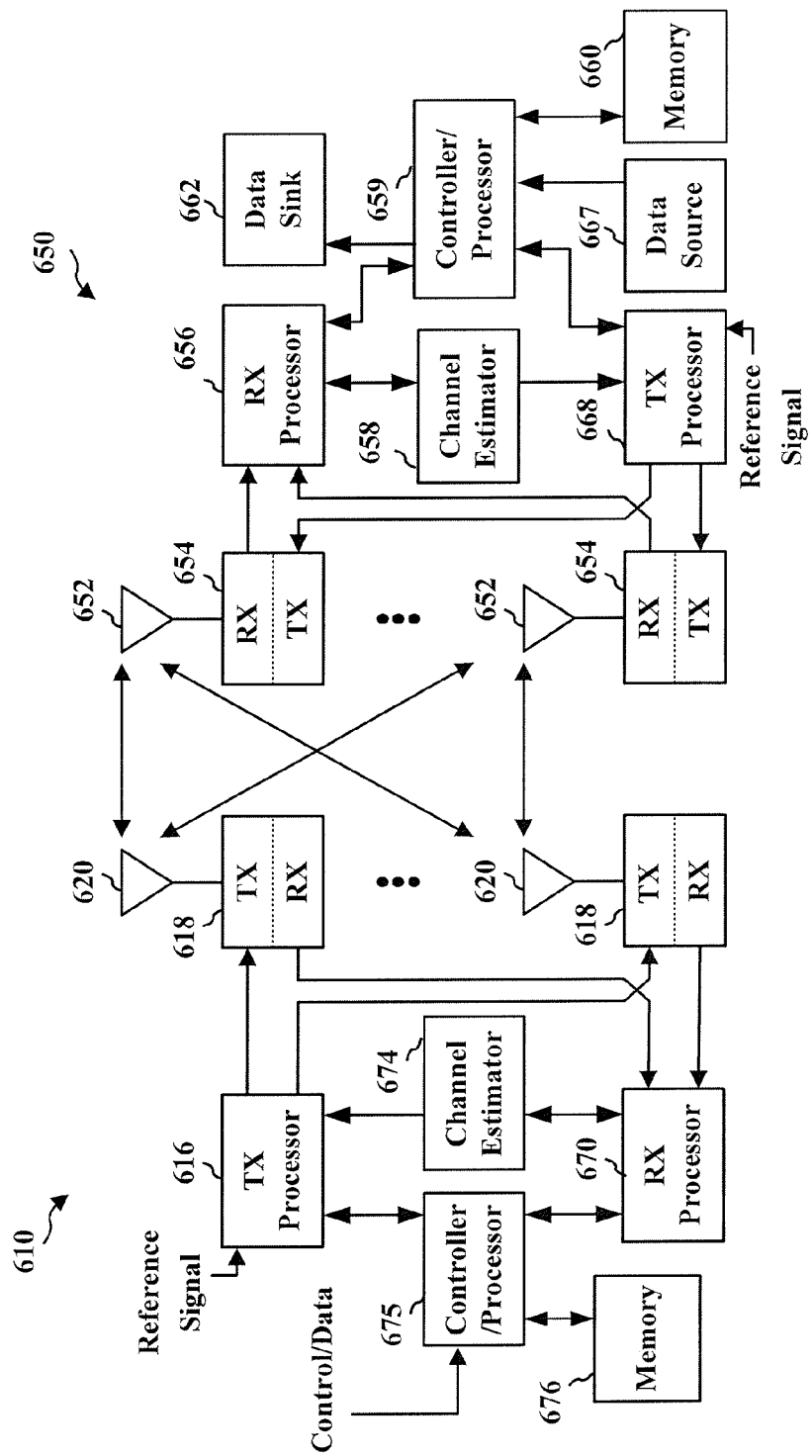
FIG. 6 is a diagram illustrating an example of an evolved Node B and user equipment in an access network.

FIG. 6 is a block diagram of an eNB 610 in communication with a UE 650 in an access network. For example, UE 650 can correspond to UE 102 or apparatus 1002, and/or eNB 610 can correspond to eNB 106, other eNBs 108, or apparatus 1202, as described herein. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and de-interleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. In some aspects, some or all of the functionality and/or operations described with respect to modules 1004, 1006, and 1008 in FIG. 10 may be performed and/or implemented in one or more of the components of UE 650.

Figure 7A:
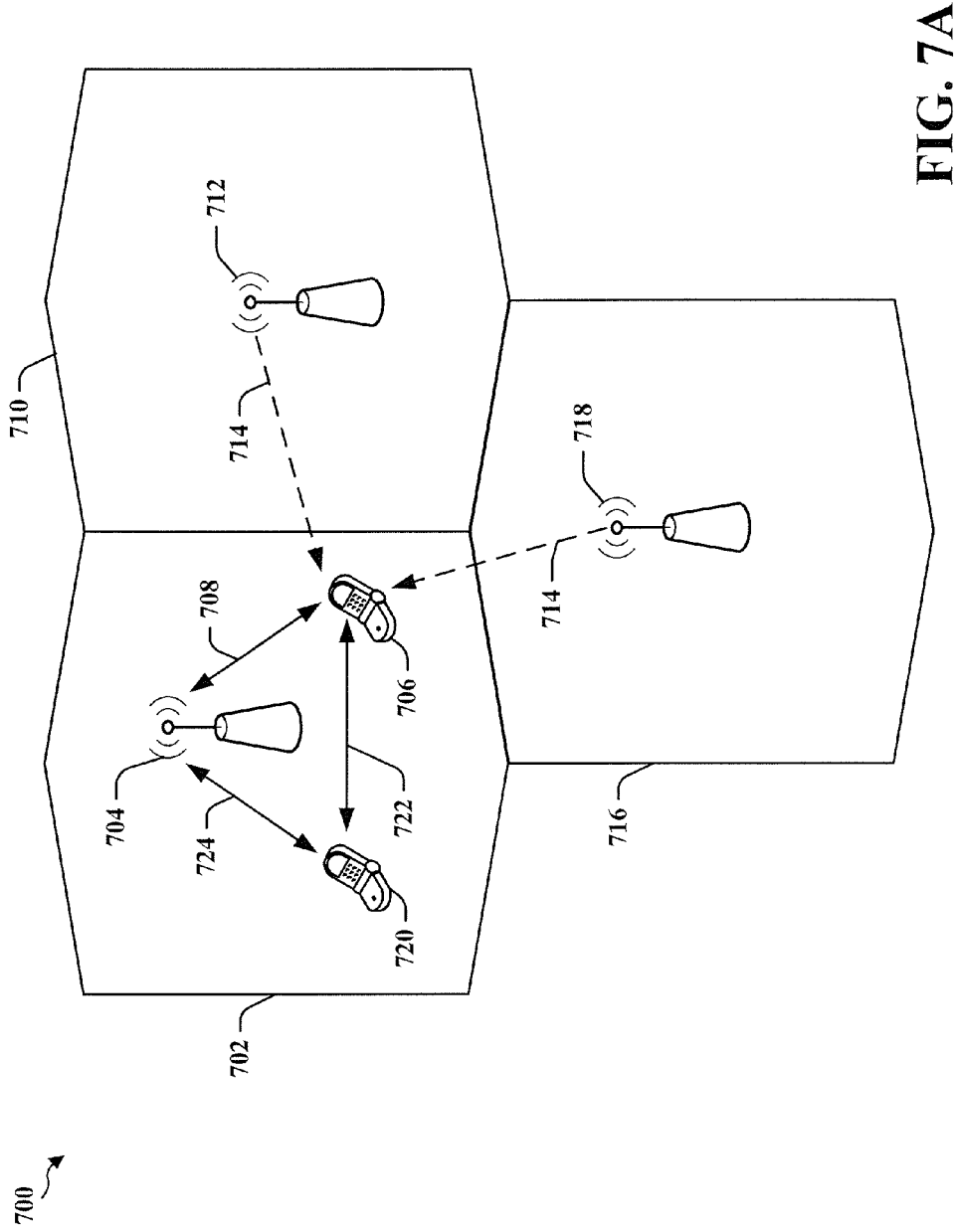
FIG. 7A is a diagram illustrating an example of an access network with non-serving cells that interfere with a serving cell.

FIG. 7A is a diagram illustrating an example of an access network 700 in which one or more neighboring cells 710, 716 may provide interference to a UE 706, which transmits or receives signals 708 in communicating with an eNB 704 in an associated serving cell 702. In an aspect, the interference detected from the non-serving cells 710, 716 may be generated by one or more signals 714 transmitted from eNBs 712, 718 that provide the cells 710, 716. Additionally, access network 700 may include one or more other UEs 720 that transmit or receive signals 722 in communicating with UE 706 and/or transmit or receive signals 724 in communicating with eNB 704. Also, for example, UE 720 can include UE 102 or apparatus 1002, and/or eNBs 704, 712, 718 can include eNB 106, other eNBs 108, or apparatus 1202, as described herein. Furthermore, additional UEs (not shown) may communicate with eNBs 712, 718 to receive communications therefrom in cells 710, 716, such as signals 714 that may cause interference to UE 706, in one example.

In an operational aspect, UE 706 may be configured to process and analyze signals 708, 714 received from multiple eNBs, including the eNB 704 providing a serving cell and one or more eNBs 712, 718 providing non-serving cells. In an aspect, signals 708, 714 may include information that can assist UE 706 in determining information regarding the eNBs 704, 712, 718, such as system release version information for one or more of the eNBs 704, 712, 718. In one aspect, UE 706 may detect system release information based on system information block (SIB) structure. For example, in SIB1/2, there may be release specific information (e.g., additional signaling structure that has been defined for later release versions (e.g., LTE Rel. 10 and newer)). In another aspect, UE 706 may detect various release specific features and determine the system release version based on detected features. For example, such features may include, but are not limited to CSI-RS, carrier type, evolved physical downlink control channel (ePDCCH), transmission mode (TM), almost blank sub-frame (ABS) configuration, aperiodic Sounding Reference Signal (SRS), carrier aggregation, etc.

With respect to CRI-RS, UE 706 may attempt to detect the presence of CSI-RS. If the UE 706 detects CSI-RS in any of the signals 708, 714, then the eNB transmitting the signaling is using LTE Rel. 10 or newer. Once UE 706 determines CRI-RS is present, the UE 706 may use blind transmission type detection (BTTD) for energy detection. In such an aspect, by assuming a Rel-10 based sequence mapping, the UE 706 may derive whether the signal corresponds to Rel-10 or Rel-11. For example, with Rel-11 a virtual cell identifier (VCID) may be in use where there is a strong CSI-RS tone at a location and where energy is not detected.

With respect to carrier type detection, UE 706 may detect whether a cell 710, 716 is a using newer or legacy carrier. In such an aspect, the UE may detect whether control format information (e.g., physical control format indicator channel (PCFICH) and/or the like) is present and/or may detect a number of sub-frames where CRS is present within a number of sub-frames (e.g., 5 sub-frames). Accordingly, based on the presence or absence of control format information and/or the number of CRSs in the sub-frame duration, the UE may determine whether the cell is using a newer carrier or a legacy carrier.

With respect to ePDCCH detection, UE 706 may determine that non-uniform transmission within one physical resource block (PRB) may indicate the presence of an ePDCCH transmission. In another aspect, UE 706 may detect ePDCCH based on coding scheme, where ePDCCH uses a convolutional coding, while PDSCH uses a turbo coding.

In another optional aspect, UE 706 may use filtering (e.g., long-term filtering) to detect system release version information. In such an aspect, UE 706 may detect the system release version information over a period of time and/or multiple resource blocks (RB). UE 706 may estimate and filter the probability of UE-RS usage from one cell and use the information to bias a BTTD algorithm. Further, UE 706 may estimate and filter the probability of transmission mode (TM) usage and use the information to bias a blind spatial scheme detector (BSSD) and/or a Rank 1 detector. Still further, UE 706 may estimate and filter the probability of type 2 distributed resource allocation and use the information for traffic to pilot ratio (TPR) algorithm, BTTD, BSSD, etc., or any combination thereof. In another aspect, filtering information may be used to identify the presence of RB bundling. For example, where a UE is configured to use TM 9 with pre-coding matrix indicator/rank indicator (PMI/RI) feedback, it may be assumed that the pre-coding is configured across multiple RBs in the frequency domain. As such, a long-term filtering technique can be used to decide the presence of and information associated with RB bundling. This determined bundling information may be used to help with BTTD (e.g., UE-RS detection).

In another optional aspect, multiple UEs 706, 720 may cooperate to determine system release information feature for one or more eNBs 712, 718 providing the non-serving cells. In an aspect, each UE 706, 720 may independently determine the system release version information for one or more eNB 712, 718. This information may be sent to a centralized entity, such as 'fusion center,' which aggregates the information. This fusion center may reside in the eNodeB, a UE, etc. The fusion center may aggregate these individual determinations from various sources to generate an improved determination. The fusion center may then broadcast this information (e.g., to one or more cells) via a SIB, which UEs then use to access the information. In another aspect, each UE 706, 720 may independently decide system release version information for one or more eNB 712, 718. The UE 706, 720 may communicate (e.g., broadcast) this information in signals 722 to neighboring UEs 706, 720. Thereafter, neighboring UEs 706, 720 can locally combine received information and broadcasts combined information. Accordingly, iterative consensus results may be reached after one or more hearing-combining-broadcast iterations.

In another aspect, UE 706 may detect uplink and/or downlink sub-frame information for one or more of the eNBs 712, 718. The UE 706 may use this information to assist in determining how/whether to cancel interference due to UL transmissions, DL receptions, etc., or any combination thereof.

In still another optional aspect, the UE 706 may use information associated with an eNB (e.g., eNB 704) to determine, identify, or otherwise obtain system release information for one or more other related eNBs (e.g., eNBs 712, 718). For example, where the UE 706 determines an eNB 704 is using Rel-10, then the UE 706 may infer than any cooperating eNBs are also using Rel-10 or newer versions of LTE. As additionally described further herein, eNBs 712, 718 may transmit CSI-RS in multiple cell layers according to one or more restrictions to assist UE 706 or other UEs in detecting the CSI-RS.

Figure 7B:
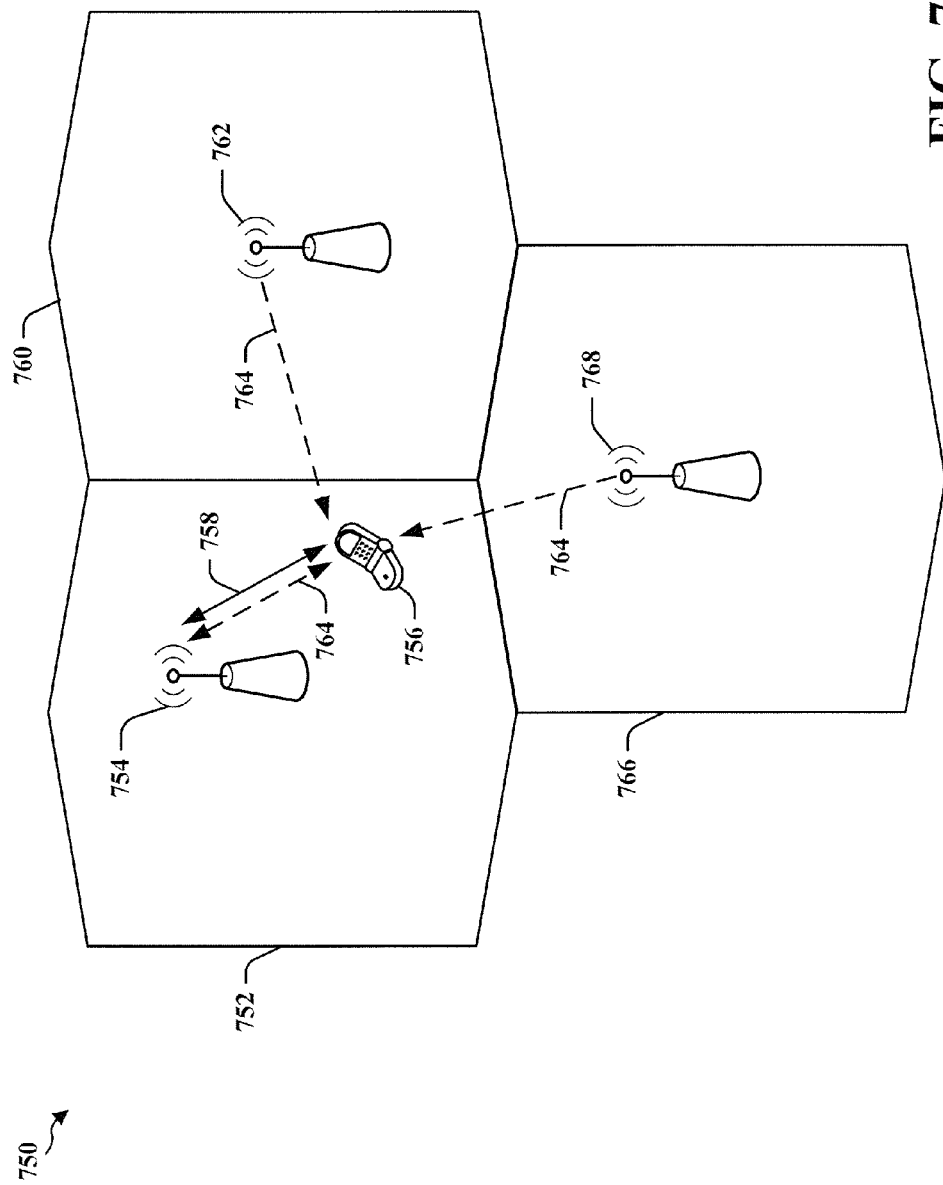
FIG. 7B is a diagram illustrating an example of an access network with a serving cell that may interfere at one layer with communications provided at other layers.

FIG. 7B is a diagram illustrating an example of an access network 750 in which a serving cell communicates with multiple UEs employing different MIMO layers. As such the eNB 754 that provides a serving cell for UE 756 may also provide interference to a UE 756, which transmits or receives signals 758 when communicating with an eNB 754, over one or more MIMO layers. Access network 750 may also include eNBs 762, 768 that respectively provide non-serving cells 760, 766, which can also transmit interfering signals 764 as described above. UE 756 can be a MIMO-capable UE, and may include UE 102 or apparatus 1002, and/or eNBs 754, 762, 768 can include eNB 106, other eNBs 108, or apparatus 1202, as described herein. Furthermore, additional UEs (not shown) may communicate with eNBs 754, 762, 768 to receive communications therefrom in cells 752, 760, 766, such as signals 764 that may cause interference to UE 756, in one example.

For example, eNB 754 can include multiple antenna resources for providing multiple communication cells at multiple layers. Thus, for example, cell 752 can include multiple layers, such as a serving cell layer providing a serving cell for UE 756, and one or more non-serving cell layers provided by other antenna resources of eNB 754 in MIMO communications. Though a single cell 752 is shown, the multiple cell layers can be considered different cells having the same, similar, or different geographical coverage area. In this regard, some signals 764 transmitted on the non-serving cell layers by eNB 754 within cell 752 may cause interference to signals 758 between UE 756 and the serving cell layer provided by eNB 754.

In an operational aspect, UE 756 may be configured to process and analyze signals 758, 764 received from multiple eNBs and/or multiple layers provided by one or more of the eNBs, including the eNB 754. In an aspect, signals 758, 764 may include information that can assist UE 706 in determining information regarding the eNBs 754, 762, 768 or related cells (or cell layers in MIMO), such as system release version information for one or more of the eNBs 754, 762, 768. In one aspect, UE 756 may detect system release information based on system information block (SIB) structure. For example, in SIB1/2, there may be release specific information (e.g., additional signaling structure that has been defined for later release versions). In another aspect, UE 756 may detect various release specific features and determine the system release version based on detected features. For example, such features may include, but are not limited to CSI-RS, carrier type, evolved physical downlink control channel (ePDCCH), transmission mode (TM), almost blank sub-frame (ABS) configuration, aperiodic Sounding Reference Signal (SRS), carrier aggregation, etc., as described above. As additionally described further herein, eNB 754 may transmit CSI-RS in multiple cell layers according to one or more restrictions to assist UE 756 in detecting the CSI-RS.

Figure 8:
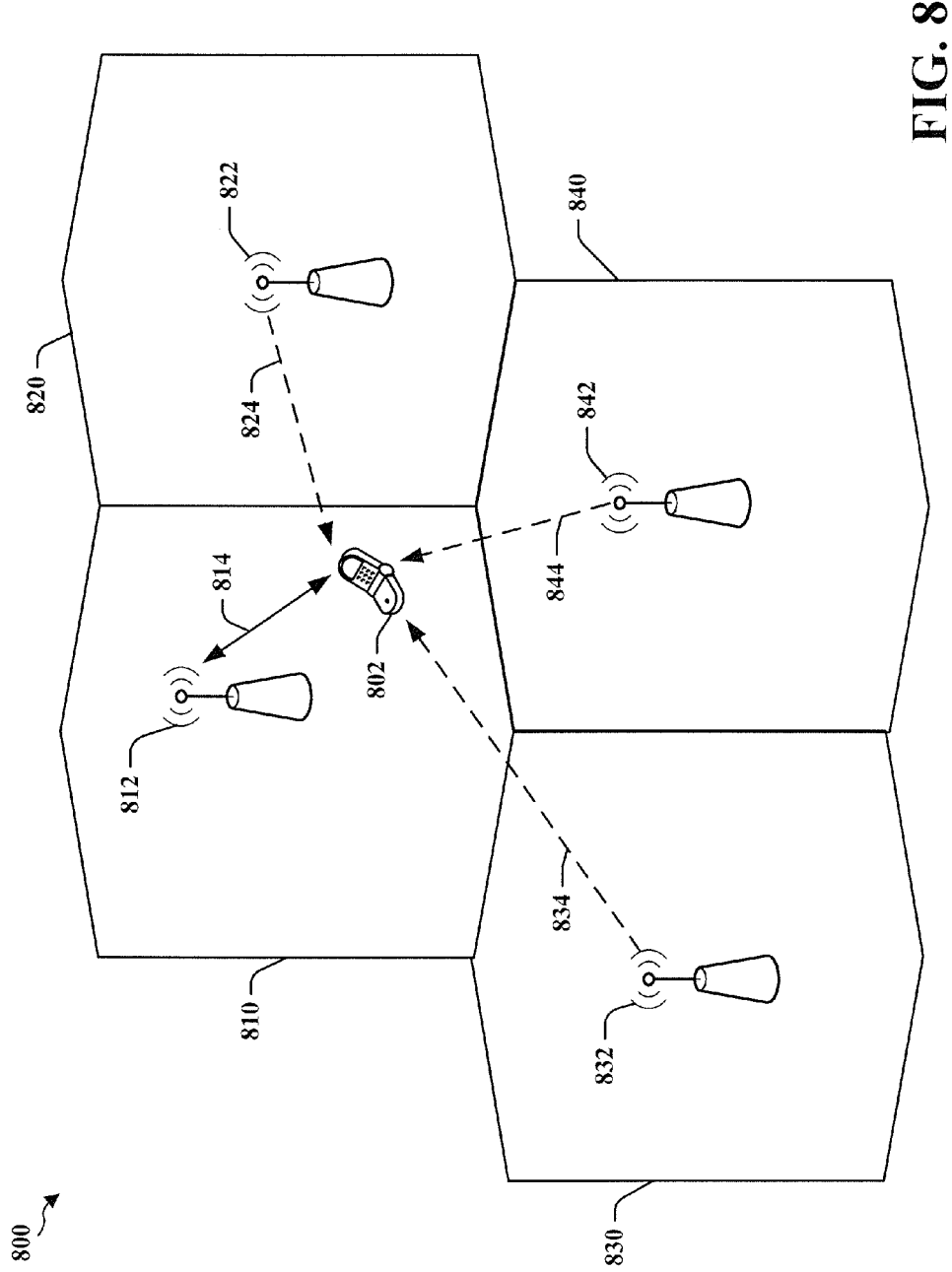
FIG. 8 is a diagram illustrating an example aspect of wireless communication including receiving various reference signals.

FIG. 8 is a diagram illustrating an example of an access network 800 in which one or more eNBs 822, 832, 842 may transmit one or more signals 824, 834, 844 based at least in part on one or more restrictions to facilitate improved identification of the signals by a UE 802. For example, UE 802 can include a UE 102 or apparatus 1002, and/or eNBs 812, 822, 832, 842 can include eNB 106, other eNBs 108, or apparatus 1202, as described herein. Moreover, for example, the one or more signals 824, 834, 844 can include reference signals, such as channel state information reference signals (CSI-RS). In an aspect, the CSI-RS transmissions 824, 834, 844 from the eNBs 822, 832, 842 are not intended for UE 802 as UE 802 is not communicating in related cells 820, 830, 840; however, UE 802 may receive the CSI-RSs by virtue of being positioned near the related cells 820, 830, 840, and may attempt to detect the CSI-RSs 824, 834, 844 for one or more purposes (e.g., to improve communications with eNB 812).

The UE 802 may transmit or receive signals 814 in communicating with an eNodeB 812 associated with a serving cell 810 of the UE 802. Cells 820, 830, 840 are referred to herein as non-serving cells, but may also be known as interfering cells, neighboring cells, etc. In addition, it is to be appreciated that an eNodeB can provide a plurality of cells, including a serving cell 810 and/or one or more non-serving cells, though an eNB providing multiple cells is not depicted. Moreover, in the present disclosure, a cell may include an individual physical cell (such as cell 810, 820, 830, 840), a cluster of cells defined as a single virtual cell, a coordinated multi-point (COMP) system including a plurality of cells, a multiple input multiple output (MIMO) system including a plurality of cells, a remote radio head (RRH) system, and/or other groups of cooperating cells, etc.

A CSI-RS may be generally described as a reference signal used to indicate certain channel properties of a communication link. The structure of a CSI-RS, which may include a set of resource elements used for CSI-RS in a resource block, may depend on the number of CSI-RSs configured within a cell and may be different for different cells. CSI-RSs are periodically transmitted by eNBs 812, 822, 832, 842 for each given cell to facilitate UEs within the cells detecting the CSI-RSs and processing the CSI-RSs to determine information for communicating with the eNBs 812, 822, 832, 842 in respective cells 810, 820, 830, 840 over a related channel, whether in the individual physical cells or a combination of cells configured as described above.

In an aspect, UE 802 may also be configured to process and analyze not only signal 814, but also signals 824, 834, 844 received from multiple eNBs, including eNB 812 providing the serving cell 810 and one or more eNBs 822, 832, 842 providing non-serving cells 820, 830, 840. For example, UE 802 may experience interference from one or more of eNB 822 transmitting signal 824 intended for UEs in cell 820, eNB 832 transmitting signal 834 intended for UEs in cell 830, or eNB 842 transmitting signal 844 intended for UEs cell 840 (e.g., and/or eNB 812 transmitting signals in other provided non-serving cells). Additionally, access network 800 may include additional UEs (not shown) that may be located within one or more cells 810, 820, 830, 840, and may respectively receive intended signals 814, 824, 834, 844 within a given cell.

In an aspect, eNBs 822, 832, 842 may transmit CSI-RS signals 824, 834, 844 based at least in part on one or more restrictions to improve detectability of the signals 824, 834, 844 at UE 802 or other UEs receiving the signals outside of the respective cells, for example. UE 802 can use the detected CSI-RS signals 824, 834, 844 to estimate a channel of the non-serving cells (e.g., cells 820, 830, 840, a combination of the cells, etc.), cancel interference caused by the CSI-RS signals 824, 834, 844 to communications from eNB 812 in a serving cell, determine VCID of non-serving neighbor cells (e.g., cells 820, 830, 840, a combination of the cells, etc.), determine resource element locations where rate matching is carried out (e.g., in code word level interference cancellation), etc. Thus, improving detection of the CSI-RS signals 824, 834, 844 at the UE 802 can improve efficiency or effectiveness of communicating with eNB 812.

The one or more restrictions to improve detectability of the signals 824, 834, 844 may include, for example, limiting or reducing the number of CSI-RS transmissions that a cell can transmit over a period of time (e.g., at a given cell, for one or more cells in a cluster, etc.), limiting or reducing a number of antenna ports, or configurations thereof, that can be used to transmit the signals 824, 834, 844, restricting VCIDs that can be indicated by the signals 824, 834, 844 or for which the signals 824, 834, 844 are transmitted by a given eNB 822, 832, 842, limiting or reducing a number of signals 824, 834, 844 transmitted in a period of time (e.g., a sub-frame), limiting or reducing a TPR to improve detecting of the signals 824, 834, 844 over data channel signals, avoiding collisions among different transmissions of signals 824, 834, 844 over the same frequency resources, subframes, etc., and/or the like.

In an aspect, UE 802 may identify that CSI-RS transmissions from one or more non-serving cells may be restricted. For example, UE 802 may identify that one or more CSI-RS transmissions 824, 834, 844 respectively transmitted by one or more eNBs 822, 832, 842 may be restricted. For example, UE 802 can determine one or more restrictions based at least in part on a radio technology, or version thereof, utilized by eNBs 822, 832, 842, signaling from the eNBs 822, 832, 842 that indicates the restriction, previous configuring of the UE 802 on the operator network related to the eNBs 822, 832, 842 that indicates the restriction, and/or the like. Using the restriction, UE 802 is able to more easily identify the CSI-RSs 824, 834, 844 from eNBs 822, 832, 842, respectively, as described further herein.

Figure 9:
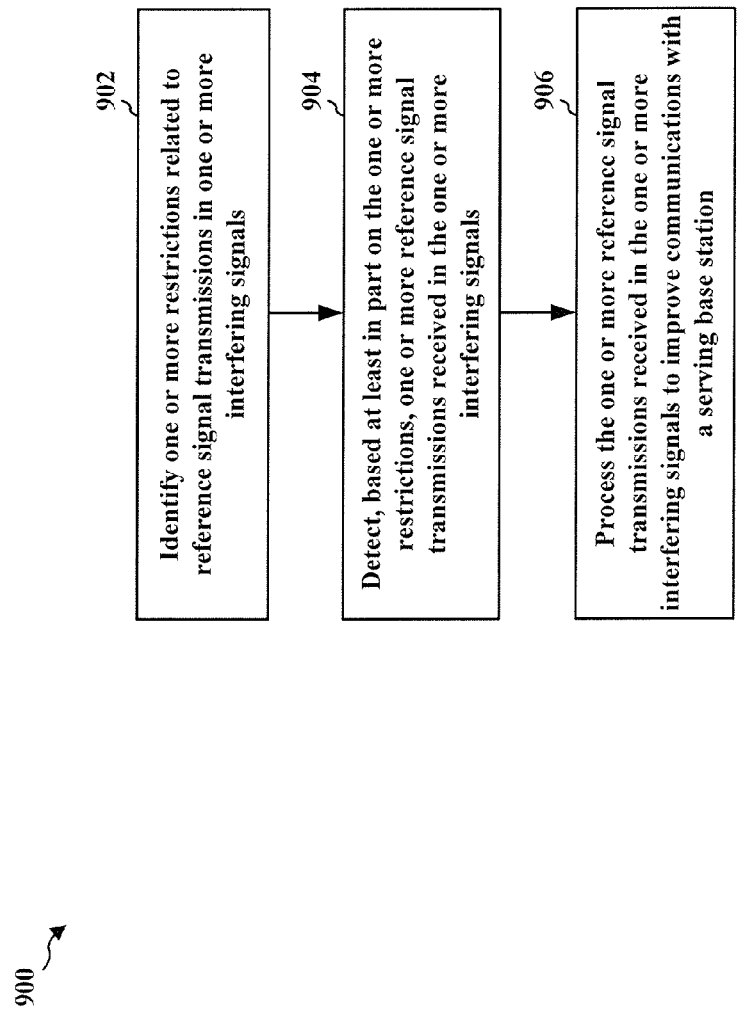
FIG. 9 is flow chart of an example method of wireless communication including detecting one or more reference signals.
Figure 10:
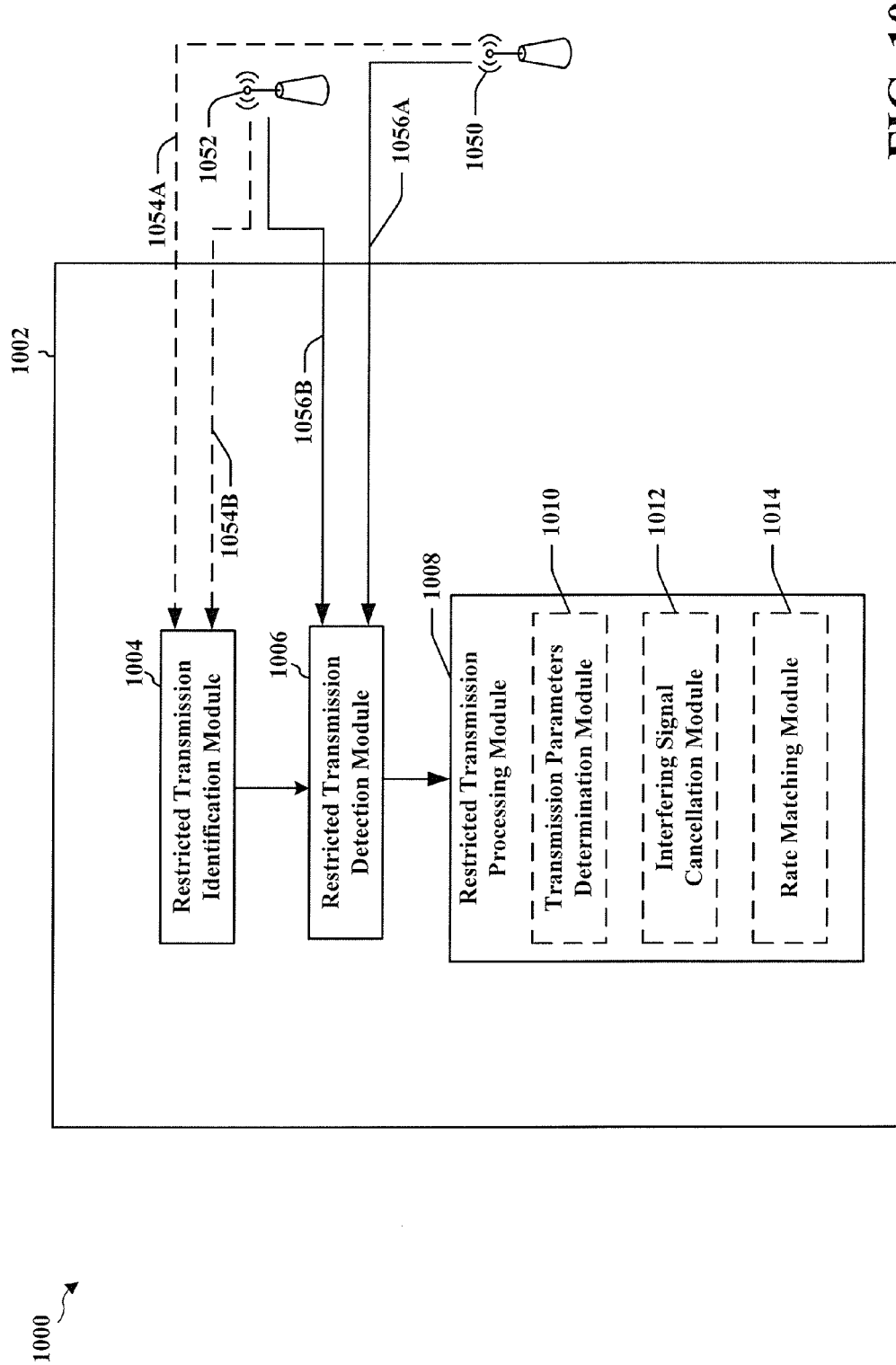
FIG. 10 is a diagram illustrating an example aspect of a system for detecting one or more reference signals.

In FIGS. 9 and 10, aspects of the present apparatus and method are depicted with reference to one or more modules and one or more methods that may perform the actions or functions described herein. Although the operations described below in FIG. 9 are presented in a particular order and/or as being performed by an example module, it should be understood that the ordering of the actions and the modules performing the actions may be varied, depending on the implementation. Moreover, it should be understood that the following actions or functions may be performed by a specially-programmed processor, a processor executing specially-programmed software or computer-readable media, or by any other combination of a hardware module and/or a software module capable of performing the described actions or functions.

FIG. 9 illustrates an example method 900 for detecting and processing reference signals from one or more eNBs for one or more non-serving cells, in accordance with aspects described herein. Though aspects are generally described in terms of CSI-RS, it is to be appreciated that the aspects described herein can apply to substantially any reference signals or other signals transmitted by eNBs to improve detection and processing at one or more UEs. FIG. 10 illustrates an example apparatus 1002 for processing CSI-RSs received from one or more eNBs 1050, 1052. Apparatus 1002 can include a UE or similar device (e.g., UE 102, UE 206, UE 650, UE 706, UE 802, etc., as described previously) that can communicate with the one or more eNBs 1050, 1052 to receive wireless network access.

Method 900 includes, at Block 902, identifying one or more restrictions related to reference signal transmissions in one or more interfering signals. Apparatus 1002 includes a restricted transmission identification module 1004 for identifying the one or more restrictions. As described, in an example, restricted transmission identification module 1004 can be provisioned with information for determining one or more restrictions related to CSI-RS (or other reference signal) transmissions to facilitate improving detectability of the CSI-RSs by the apparatus 1002. Restricted transmission identification module 1004 can be provisioned based on hardcoded information or otherwise information stored permanently or semi-permanently in a memory the apparatus 1002 (e.g., in apparatus 1002 firmware, in a volatile or non-volatile memory, in a subscriber identity module (SIM) card, etc.), receiving a configuration from the network (e.g., via one or more eNBs 1050, 1052, etc.), and/or the like.

In one example, eNBs 1050, 1052 can transmit information related to restrictions utilized respectively by eNBs 1050, 1052 (and/or other eNBs) in transmitting CSI-RSs that may be received by apparatus 1002. As depicted, eNBs 1050, 1052 can respectively transmit signals 1054A, 1054B, which may be broadcast signals (e.g., SIB), dedicated signals, etc., to apparatus 1002 including the restriction information for CSI-RS transmissions, as described further in reference to FIGS. 11 and 12. Restricted transmission identification module 1004 can receive the restriction information, whether from hardcoded or otherwise permanently or semi-permanently stored information, from a configuration, from eNBs 1050, 1052, etc., and restricted transmission detection module 1006 can utilize the information in detecting CSI-RSs received from eNBs 1050, 1052, as described further herein. In one example, one of eNBs 1050 or 1052 may provide a serving cell for apparatus 1002. In an example, restricted transmission identification module 1004 may receive restriction information for CSI-RSs of one or more non-serving cell from serving cell communications.

Method 900 further includes, at Block 904, detecting, based at least in part on the one or more restrictions, one or more reference signal transmissions received in the one or more interfering signals. Apparatus 1002 includes a restricted transmission detection module 1006 for detecting one or more signals 1056A, 1056B received from eNBs 1050, 1052 as including CSI-RS transmissions based on the one or more restrictions. For instance, restricted transmission detection module 1006 can obtain the restriction information from restricted transmission identification module 1004, and can use the information in determining whether received signals correspond to CSI-RS transmissions or can otherwise receive signals using the restricted transmission detection module 1006 based on the restriction information.

For example, the restriction information can specify a transmission periodicity for the CSI-RS, a number or set of antenna ports used to transmit the CSI-RS, information regarding cell identifiers used in transmitting the CSI-RS, a maximum number of CSI-RS transmitted for a cluster of cells, a combination thereof, and/or the like. The apparatus 1002 then may use these parameters for improved identification of CSI-RS transmissions.

In LTE networks, for example, several CSI-RS transmission periodicities may be allowed such as 5 milliseconds (ms), 10 ms, 20 ms, etc. Without knowledge of limitation or restriction as to the periodicity, however, a UE (e.g., apparatus 1002) may perform blind detection of CSI-RS transmissions for all possible transmission periodicities for a given eNB, which can consume more resources than if the UE is able to determine the periodicity employed by the eNB. Accordingly, restricted transmission detection module 1006 may receive information regarding one or more periodicities used by one or more of eNBs 1050, 1052 (e.g., individually or specified for a cluster of related cells) in transmitting CSI-RS for one or more cells (e.g., use of 5 ms periodicity). Accordingly, restricted transmission detection module 1006 may improve CSI-RS detection for apparatus 1002 by detecting whether signals received from eNBs 1050, 1052 for a given cell are CSI-RS signals based on the specified periodicity (e.g., if the signals are received at the specified periodicity).

In an aspect, restricted transmission identification module 1004 receives information regarding restricted CSI-RS transmission periodicities from signals 1054A, 1054B from eNBs 1050, 1052, which can be broadcast signals (e.g., SIB), dedicated signals, and/or the like. In an additional or alternative aspect, all cells in a cluster, all cells in an operator network, all cells using the same radio access technology (RAT), etc., may be assumed to be using similar restricted CSI-RS transmission periodicities (or an indication of such can be signaled). In this aspect, where restricted transmission detection module 1006 determines periodicity of CSI-RS transmission for at least one eNB in a cluster, network, RAT, or other grouping, for example, restricted transmission detection module 1006 may assume that the same CSI-RS transmission periodicity is used for other non-serving cells in the cluster, network, RAT, etc., and can use this CSI-RS transmission periodicity for improving detection of CSI-RS transmissions for the non-serving cells in the cluster, network, RAT, etc.

In another aspect, eNB 1050, 1052 may signal, via a broadcast message, a number of CSI-RS transmission periodicities that the eNBs or related cells in the cluster are using without explicitly signaling the periodicity values. In this example, restricted transmission identification module 1004 receives the signaling in signals 1054A, 1054B from eNBs 1050, 1052, and restricted transmission detection module 1006 can utilize the number of periodicities to determine a periodicity for the given cell or cells in the cluster, network, RAT, etc. Thus, in conjunction with the previous example, restricted transmission detection module 1006 can discern the periodicity for CSI-RS transmission of one or more cells provided by eNBs 1050, 1052 based on the number of periodicities received in the signaling along with a number of different periodicities detected of CSI-RSs transmitted in one or more other related cells. Once a number of periodicities are encountered that correspond to the number of periodicities received in the signaling, restricted transmission detection module 1006 can determine it has encountered all periodicities used by the cells in the cluster, and can attempt to identify CSI-RSs using the encountered periodicities. This may provide with flexibility in managing the network, for example, by allowing the changes in periodicities used by the cells in the cluster while still allowing the UE to narrow possible periodicities to utilize in attempting to detect CSI-RS transmissions.

In another aspect, the one or more restrictions can relate to a number of antenna ports in an antenna port configuration used for CSI-RS transmissions. For example, in LTE, a CSI-RS transmission may use 1, 2, 4, or 8 antenna ports as defined in 3GPP Specifications. Thus, restricted transmission identification module 1004 can similarly determine information regarding an antenna port configuration (e.g., which and/or a number of antenna port(s)) used to transmit the CSI-RS for one or more cells at an eNB 1050, 1052 using aspects described above with respect to periodicity. For example, information regarding the antenna port(s) (and/or number of antenna ports, antenna port configuration, etc.) used to transmit CSI-RS can be obtained from hardcoded or otherwise permanently or semi-permanently stored information in apparatus 1002, received in provisioning from the operator network, received in signals 1054A, 1054B and/or signals from an eNB providing a serving cell (as related to a cell, a cluster of cells, a network of cells, cells using a certain radio access technology, etc.), and/or the like. Restricted transmission detection module 1006 can similarly use the indicated antenna port information, whether an antenna port configuration, number of antenna ports, etc., to detect one or more CSI-RSs from eNBs 1050, 1052 for one or more non-serving cells. For example, restricted transmission detection module 1006 can use an indicated antenna port configuration to detect the CSI-RS and/or can use an indicated number of ports or configurations to discern the different ports or configurations used in a cluster, network, RAT, or other grouping of cells.

In another aspect, the one or more restrictions can relate to restricting a number of VCIDs relating to the CSI-RS transmissions. VCIDs can typically correspond to physical cell identifiers (PCI) for cells, but additional VCIDs can be defined for clusters of cells. eNBs 1050, 1052 can transmit CSI-RS not only for each physical cell, but also for clusters of cells, as described, and may thus transmit not only CSI-RS based on VCID for physical cells (which may correlate to the PCI), but also for those of the clusters. In this example, restricted transmission identification module 1004 can receive a list of VCIDs used in generating CSI-RS sequences (e.g., from signals 1054A, 1054B). For instance, restricted transmission identification module 1004 can receive the list of VCIDs, a range of VCIDs inclusive of a list of VCIDs, etc., used by eNBs 1050, 1052 in generating the CSI-RS sequences for one or more cells. Thus, restricted transmission detection module 1006 can obtain the list or range of VCIDs from restricted transmission identification module 1004, and can attempt to identify signals 1056A, 1056B as CSI-RS transmissions based at least in part on the VCIDs.

In another example, eNBs 1050, 1052 may be restricted to using a set of VCIDs that may be equal to a set of PCIs being used in each of a cluster of cells in transmitting CSI-RSs. In one example, if the actual number of VCIDs is greater than the number of PCIs, a pre-defined rule may be used to determine possible VCIDs from the set of PCIs. For example, eNBs 1050, 1052 can be restricted to using certain VCIDs for clusters where certain PCIs are used by the eNBs 1050, 1052, and the eNB 1050, 1052, and restricted transmission identification module 1004 can be preconfigured with one or more rules associating or defining the relationships between the PCIs and useable VCIDs. In another example, restricted transmission identification module 1004 can otherwise receive the information as described (e.g., in signals 1054A, 1054B, in previous provisioning on the operator network, and/or the like). As similarly described above, restricted transmission detection module 1006 can then use the list of possible VCIDs to attempt detection of CSI-RS transmission. In an aspect, restricted transmission identification module 1004 may detect PCIs of strongest cells in a cell cluster and then derive the list of the possible VCIDs from the PCIs of the strongest cells based on the associated list of VCIDs for the PCIs.

In another aspect, the one or more restrictions can relate to restricting a number of CSI-RS transmissions that are allowed in a sub-frame or a sequence of sub-frames of a cell or a cluster of cells. For example, for a cluster of cells, relate eNBs may be restricted to transmit up to 2 CSI-RS transmissions in each sub-frame. This may be achieved by suitable time-domain orthogonalization among the various CSI-RS transmissions (e.g., among eNBs 1050, 1052 for cells thereof in a related cluster). Restricted transmission identification module 1004 can thus receive this information (e.g., from hardcoded or otherwise permanently or semi-permanently stored information, operator configuration, signaling 1054A, 1054B, etc.), and restricted transmission detection module 1006 can detect CSI-RS transmissions from non-serving cells based at least in part on this information. In an example, restricted transmission detection module 1006 may use the indicated number of CSI-RS transmissions to eliminate false candidates in detecting which of a number of received signals correspond to CSI- RSs. For example, restricted transmission detection module 1006 may observe a number of signals for a cell within a time period that have similar properties, and where a number of signals with similar properties are equal to the restricted number of signals, restricted transmission detection module 1006 may determine the signals are CSI-RS transmissions. Further, though it is possible that CSI-RS may be transmitted and received for cells outside the cluster, these may be weak enough so as not to trigger a significant number of false alarms.

In another aspect, restricted transmission identification module 1004 can be provisioned (e.g., by hardcoded or otherwise permanently or semi-permanently stored information, operator configuration, receiving broadcast signals 1054A, 1054B, etc.) with one or more predefined rules that correlate one or more of the parameters described above in restricting CSI-RS transmissions for easier detection. For example, in an aspect, a rule may be defined to correlate sub-frame offsets to antenna ports (e.g., for CSI-RS sequences using sub-frame modulo 5=0, use 1 antenna port, for CSI-RS sequences using sub-frame modulo 5=1, use 2 antenna ports, etc.), or conversely antenna ports to sub-frame configurations (e.g., CSI-RS sequences using 1 antenna port use a specified (or one of a plurality of specified) sub-frame configurations. In either case, restricted transmission detection module 1006 receives the CSI-RS 1056A, 1056B from eNBs 1050, 1052, and can determine a parameter thereof (e.g., sub-frame offset, a number of antenna ports, etc.). Based on this parameter, restricted transmission detection module 1006 can then determine another property of the CSI-RS (e.g., number of antenna ports, possible sub-frame configuration(s), etc.) based on the rules provisioned in restricted transmission identification module 1004. Restricted transmission detection module 1006 can then use the additional property to verify whether the signal 1056A, 1056B is a CSI-RS and/or to detect subsequent CSI-RS transmissions. Moreover, eNBs 1050, 1052 can define additional or alternative restrictions to assist UEs in detecting CSI-RS without modifying behavior of the UEs.

In aspects described further herein, eNBs 1050, 1052 may restrict CSI-RS transmissions for one or more cells based on one or more limits placed on traffic-to-pilot (TPR) ratio (e.g., a physical downlink shared channel (PDSCH) to CSI-RS ratio). This restricts the TPR to a relatively smaller value as boosting power of PDSCH resource elements (REs) relative to CSI-RS REs may degrade CSI-RS detection performance. In other aspects, eNBs 1050, 1052 may restrict CSI-RS transmissions for one or more cells to avoid at least partial collisions among different CSI-RS transmissions. For example, eNBs 1050, 1052, where these eNBs have cells in a similar cluster, may be prevented from transmitting CSI-RS with the same periodicity or where one periodicity is a multiple of the other for cells in the same cluster.

Method 900 also includes, at Block 906, processing the one or more reference signal transmissions received in the one or more interfering signals to improve communications with a serving base station. Apparatus 1002 includes a restricted transmission processing module 1008 for utilizing the CSI-RS transmissions received in interfering signals (e.g., from non-serving eNBs 1050, 1052 or non-serving cells provided by an eNB that also provides the serving cell) for one or more purposes, such as improving communications with a serving base station. For example, restricted transmission processing module 1008 may optionally include a transmission parameters determination module 1010 for determining one or more parameters related to the CSI-RS or a related channel. For example, transmission parameters determination module 1010 can estimate the related channel based on the CSI-RS for acquiring or otherwise measuring aspects of the channel. In another example, transmission parameters determination module 1010 may determine one or more VCIDs of the CSI-RS (e.g., which may be indicated to restricted transmission detection module 1006 for detecting CSI-RS transmissions for the other VCIDs). It is to be appreciated that transmission parameters determination module 1010, in an example, may determine other transmission parameters for feedback to restricted transmission detection module 1006 (e.g., sub-frame offset, antenna ports used, etc. for use in applying one or more predefined rules for detecting the CSI-RS or subsequent CSI-RSs, as described).

In yet another aspect, restricted transmission processing module 1008 may optionally include an interfering signal cancellation module 1012 for cancelling the detected CSI-RS from a signal received from a serving base station (e.g., to improve communications with the serving base station). In another aspect, restricted transmission processing module 1008 may optionally include a rate matching module 1014 for determining resource elements in signals from eNBs 1050, 1052 where rate matching is carried out (e.g., for code word level interference cancellation (CWIC)) based on the detected CSI-RSs. In this regard, rate matching at rate matching module 1014 is improved based on improved detection of the CSI-RSs of non-serving cells.

Figure 11:
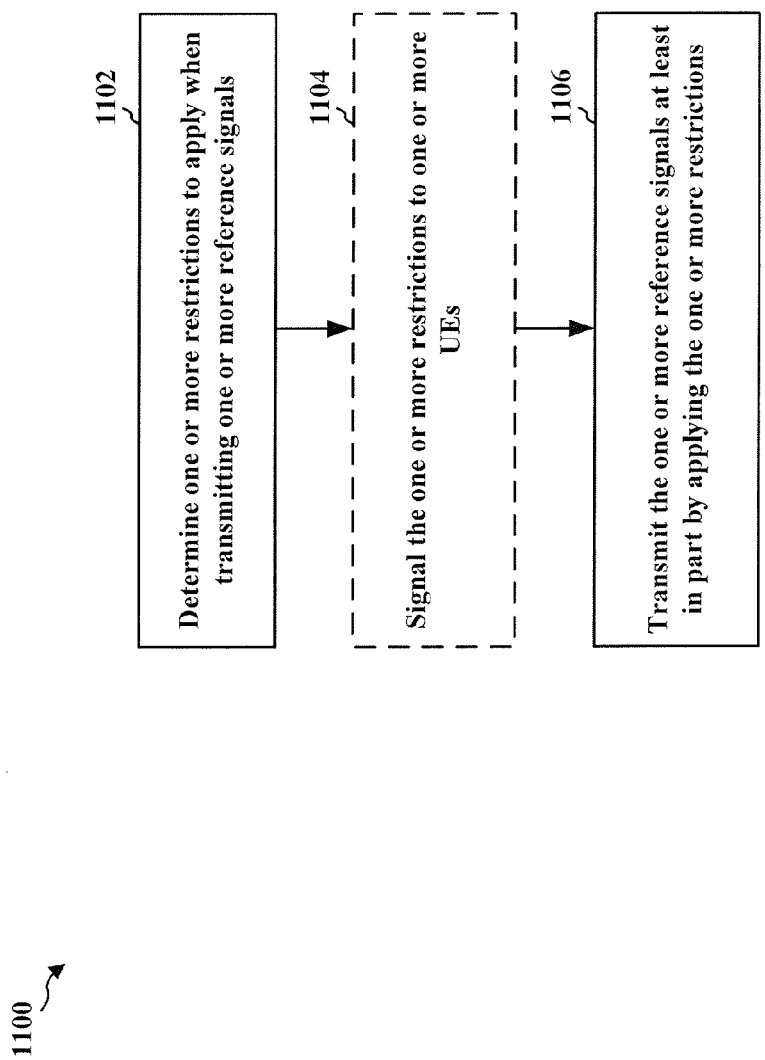
FIG. 11 is flow chart of an example method of wireless communication including transmitting one or more reference signals.
Figure 12:
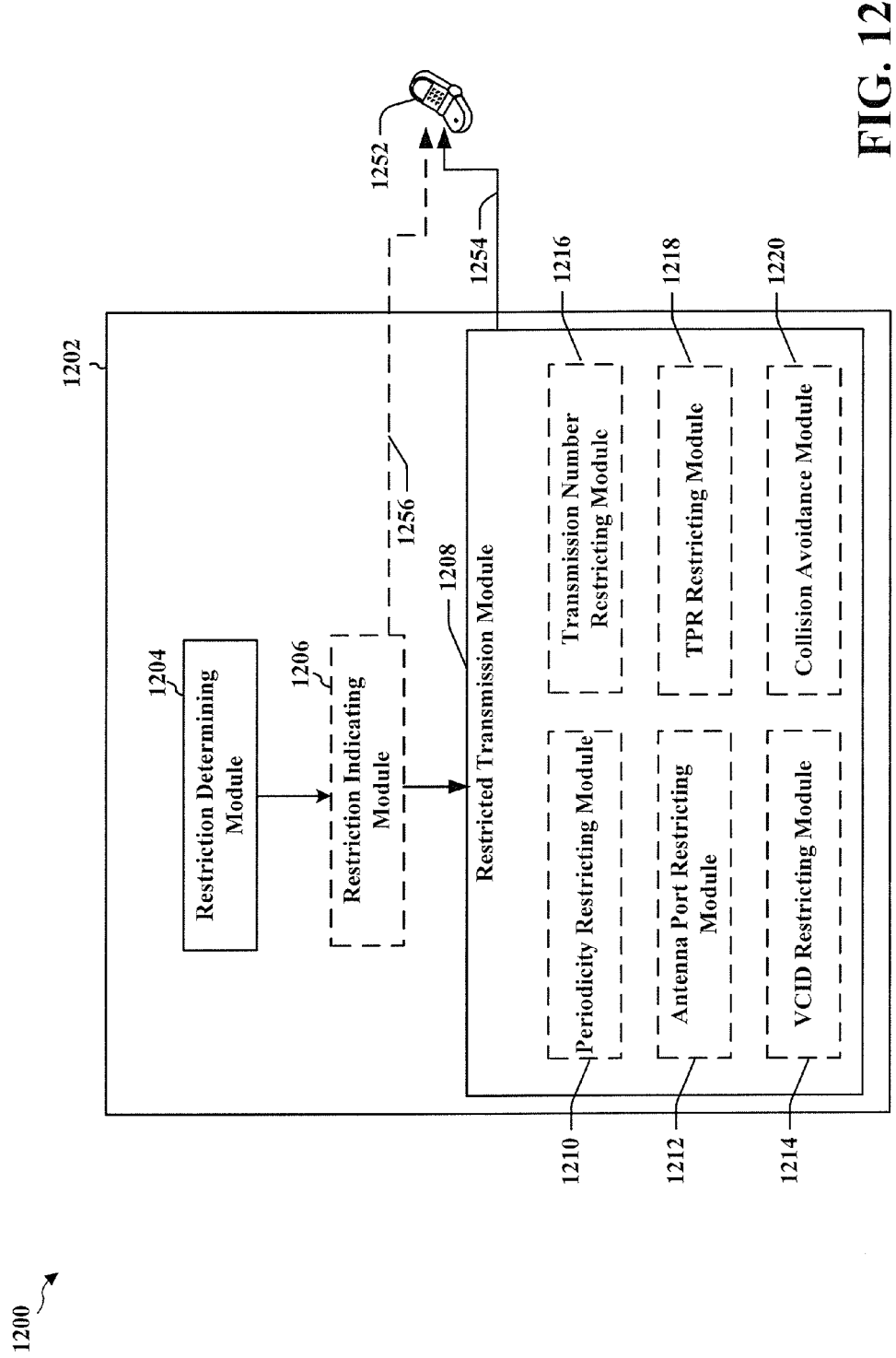
FIG. 12 is a diagram illustrating an example aspect of a system for transmitting one or more reference signals.

In FIGS. 11 and 12, aspects of the present apparatus and method are depicted with reference to one or more modules and one or more methods that may perform the actions or functions described herein. Although the operations described below in FIG. 11 are presented in a particular order and/or as being performed by an example module, it should be understood that the ordering of the actions and the modules performing the actions may be varied, depending on the implementation. Moreover, it should be understood that the following actions or functions may be performed by a specially-programmed processor, a processor executing specially-programmed software or computer-readable media, or by any other combination of a hardware module and/or a software module capable of performing the described actions or functions.

FIG. 11 illustrates an example method 1100 for transmitting CSI-RSs according to one or more restrictions, in accordance with aspects described herein. FIG. 12 illustrates an example apparatus 1202 for transmitting CSI-RSs that can be received by one or more UEs 1252. Apparatus 1202 can include an eNB or similar device (e.g., eNB 106, other eNBs 108, eNBs 204, eNBs 610, eNBs 704, 712, 718, eNBs 812, 822, 832, 842, etc., as described previously) that can communicate with the one or more UEs 1252 to provide wireless network access via one or more cells. Method 1100 includes, at Block 1102, determining one or more restrictions to apply when transmitting one or more reference signals. Apparatus 1202 includes a restriction determining module 1204 for determining the one or more restrictions. In an example, restriction determining module 1204 can be provisioned with information regarding one or more restrictions related to CSI-RS transmissions to facilitate improving detectability of the CSI-RSs by UEs receiving the CSI-RS transmissions. The one or more restrictions may be specific to CSI-RS for given cell(s), in one example. Restriction determining module 1204 can be provisioned based on hardcoded or otherwise permanently or semi-permanently stored information in the apparatus 1202, retrieving a configuration from a memory of the apparatus 1202, receiving a configuration from the operator network (e.g., via network configuration), and/or the like. Moreover, for example, the restrictions can be related to one or more cells provided by the apparatus 1202, a cluster of cells including one or more cells provided by the apparatus 1202, etc., as described.

As described above, the one or more restrictions can relate to a transmission periodicity for one or more CSI-RSs, a number or set of antenna ports used to transmit one or more CSI-RSs, information regarding cell identifiers used in transmitting one or more CSI-RSs, a maximum number of CSI-RSs transmitted for a cluster of cells, restricting a TPR, restricting parameters to avoid CSI-RS collisions, a combination thereof, and/or the like. Method 1100 can optionally include, at Block 1104, signaling the one or more restrictions to one or more UEs. Thus, for example, apparatus 1202 optionally includes a restriction indicating module 1206 for signaling the one or more restrictions via signal 1256 to UE 1252. In an example, restriction indicating module 1206 can signal the one or more restrictions where the UE 1252 can benefit from information regarding the one or more restrictions (e.g., where the restrictions relate to restricting periodicity, antenna ports, cell identifiers, etc.). Thus, it is to be appreciated that restriction indicating module 1206 can indicate the one or more restrictions to UE 1252 for certain types of restrictions.

Method 1100 also includes, at Block 1106, transmitting the one or more reference signals at least in part by applying the one or more restrictions. Thus, apparatus 1202 includes a restricted transmission module 1208 for transmitting signals 1254, such as one or more CSI-RSs for one or more cells, based on the one or more restrictions, which can be received by one or more UEs 1252. Thus, for example, restricted transmission module 1208 may optionally include a periodicity restricting module 1210 for restricting a periodicity for transmitting CSI-RS (or other signals). The restriction on periodicity can be defined and determined by restriction determining module 1204 (e.g., based on information provisioned to the restriction determining module 1204 or otherwise). In this example, restriction indicating module 1206 may signal the periodicity at which the CSI-RS is transmitted or a number of periodicities used by cells in a cluster, network, RAT, etc. related to the cell for which the CSI-RS is being transmitted, etc. in signal 1256, as described. Periodicity restricting module 1210 can ensure that CSI-RS is transmitted at the restricted periodicity (e.g., 5 ms, 10 ms, etc.), as indicated, or using a restricted periodicity such that the number of periodicities used in the cluster of cells does not exceed an indicated number. Periodicity restricting module 1210 can restrict the periodicity in this regard by causing restricted transmission module 1208 to transmit one or more CSI-RS signals 1254 at the periodicity. UE 1252 can detect signal(s) 1254 as CSI-RS based on received periodicity restriction information, as described above.

In another example, restricted transmission module 1208 may optionally include an antenna port restricting module 1212 for restricting antenna ports or related antenna port configurations utilized in transmitting CSI-RS (or other signals) for one or more cells. The restriction on antenna port configurations can be defined and determined by restriction determining module 1204 (e.g., based on information provisioned to the restriction determining module 1204 or otherwise). In this example, restriction indicating module 1206 may signal an indication of the antenna ports (or related antenna port configuration) over which the CSI-RS is transmitted or a number of antenna ports (or antenna port configurations) used by cells in a cluster, network, RAT, etc. related to the cell over which the CSI-RS is being transmitted, etc. in signal 1256, as described. Antenna port restricting module 1212 can ensure that CSI-RS for one or more cells is transmitted using the restricted antenna ports (e.g., 1 or 2, 4, 8, etc. ports) or according to the antenna port configuration by causing restricted transmission module 1208 to transmit the CSI-RS signal 1254 using the number of antenna ports or specific antenna port configuration. UE 1252 can detect signal 1254 as CSI-RS based on any antenna port configuration information received, as described above.

In yet another example, restricted transmission module 1208 may optionally include a VCID restricting module 1214 for restricting VCIDs for which CSI-RS (or other signals) are transmitted for one or more cells. The restriction on VCIDs can be defined and determined by restriction determining module 1204 (e.g., based on information provisioned to the restriction determining module 1204 or otherwise). In this example, restriction indicating module 1206 may signal the VCIDs for which the CSI-RS is transmitted (e.g., as an explicit indication of the VCIDs, an indication of a range of VCIDs, etc.), as described. VCID restricting module 1214 can ensure that CSI-RS is transmitted for the VCIDs indicated by restriction indicating module 1206 and not for other VCIDs. In another example, VCID restricting module 1214 can ensure VCIDs correspond to a number of PCIs used in a cluster such that the CSI-RSs transmitted by restricted transmission module 1208 do not exceed the number of PCIs. In another example, VCID restricting module 1214 can restrict VCIDs used based on PCIs assigned to the cells, where the PCIs have an associated list of possible VCIDs that can be used, as described above. VCID restricting module 1214 can ensure VCIDs comply with the associated list for the related PCIs. Thus, UE 1252 can be provisioned with similar information, as described, and can determine a set of possible VCIDs related to a PCI to detect the CSI-RSs transmitted from restricted transmission module 1208 for the VCIDs, as described.

In yet another example, restricted transmission module 1208 may optionally include a transmission number restricting module 1216 for restricting the number of signal 1254 transmissions for one or more cells in a period of time (e.g., a sub-frame). The restriction on the number of transmissions can be defined and determined by restriction determining module 1204 (e.g., based on information provisioned to the restriction determining module 1204 or otherwise). In this example, restriction indicating module 1206 may signal the number of transmissions in signal 1256, which may apply to one or more cells in a cluster, network RAT, etc., as described. Transmission number restricting module 1216 can ensure that CSI-RS is transmitted at the maximum number of times over the period of time by defining a transmission schedule for the restricted transmission module 1208 that limits transmission of the CSI-RS signal 1254 to the maximum number of transmissions in the period of time. The UE 1252 can use this number to detect the number of signals in the period of time (e.g., the sub-frame) having certain properties, which may indicate the signals are CSI-RS transmissions, as described above.

In another example, restricted transmission module 1208 may optionally include a TPR restricting module 1218 for restricting a TPR for data transmissions as compared to CSI-RS transmissions for one or more cells. The restriction on the number of transmission can be defined and determined by restriction determining module 1204 (e.g., based on information provisioned to the restriction determining module 1204 or otherwise). In any case, TPR restricting module 1218 can enforce the TPR restriction on a power used to transmit data channel communications (e.g., PDSCH REs) based on a power used to transmit the CSI-RS. This can improve detection of the CSI-RS signals by UE 1252 by resulting in a larger received power disparity between CSI-RS signals and PDSCH signals.

In a further example, restricted transmission module 1208 may optionally include a collision avoidance module 1220 for avoiding potential collision of CSI-RS transmissions of one or more cells within a cluster or other grouping of cells. The restrictions can be based on periodicity, frequency resources, sub-frame offsets, etc. utilized for CSI-RS transmission for cells in a cluster to avoid collision. In this regard, for example, collision avoidance module 1220 can communicate with one or more network components or eNBs providing other cells in a cluster (not shown) to ensure the cells do not use some of the same periodicities, frequency resources, sub-frame offsets, etc. For instance, since two CSI-RS sequences with same frequency resource and same sub-frame offsets may have collisions (in an optional aspect, irrespective of periodicities), for any two CSI-RS sequences with the same frequency resource, collision avoidance module 1220 can configure sub-frame offset and periodicity pairs (O1,P1) and (O2,P2) to satisfy the following condition: $O2+m*P2 \neq O1+n*P1$, for any two integers m and n. This can improve detectability of CSI-RS transmissions 1254 at UE 1252 by mitigating interference of CSI-RSs among eNBs.

Figure 13:
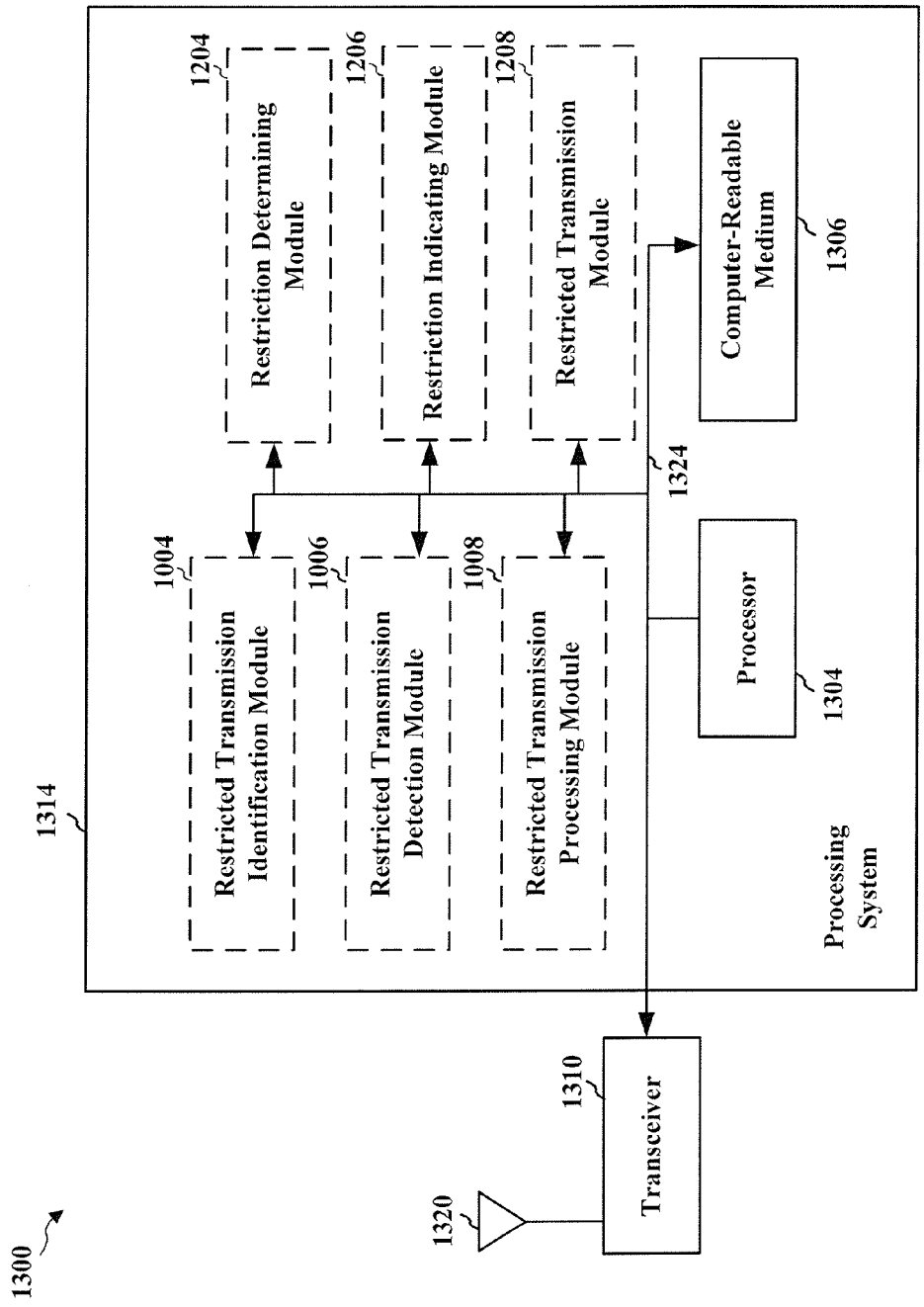
FIG. 13 is a diagram illustrating an example of a hardware implementation for an apparatus employing a processing system in accordance with aspects described herein.

FIG. 13 is a diagram 1300 illustrating an example of a hardware implementation for an apparatus 1002 or apparatus 1202 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1004, 1006, 1008, 1204, 1206, 1208, described above in apparatuses 1002 and 1202, and/or the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system may further include at least one of the modules 1004, 1006, 1008, 1204, 1206, 1208, or any related modules described in connection with apparatuses 1002 and 1202. The modules may be software modules running in the processor 1304, resident/stored in the computer-readable medium 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659. Similarly, in an example, the processing system 1314 may be a component of the eNB 610 and may include the memory 676 and/or at least one of the TX processor 616, the RX processor 670, and the controller/processor 675.

In one configuration, the apparatuses 1002 and 1202 are shown as including various modules including restricted transmission identification module 1004, restricted transmission detection module 1006, restricted transmission processing module 1008, restriction determining module 1204, restriction indicating module 1206, restricted transmission module 1208 and/or related modules. The aforementioned modules includes the processing system 1314 configured to perform the functions described in connection with the modules. As described supra, the processing system 1314 may include the TX Processor 668, the RX Processor 656, the controller/processor 659, the TX processor 616, the RX processor 670, and the controller/processor 675. As such, in one configuration, the modules may include the TX Processor 668, the RX Processor 656, the controller/processor 659, the TX processor 616, the RX processor 670, and/or the controller/processor 675 configured to perform the functions described in connection with the modules.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for improving identification of reference signal transmissions at a user equipment (UE), comprising:
    identifying one or more restrictions related to reference signal transmissions in one or more interfering signals;
    detecting, based at least in part on the one or more restrictions, one or more reference signal transmissions received in the one or more interfering signals; and
    processing the one or more reference signal transmissions received in the one or more interfering signals to improve communications with a serving base station,
    wherein processing the one or more reference signal transmissions includes one or more of:
        estimating a channel related to the one or more reference signal transmissions,
        cancelling interference caused by the one or more reference signal transmissions to communications from the serving base station,
        determining virtual cell identifiers of the one or more reference signal transmissions, or
        determining resource element locations for rate matching using the one or more reference signal transmissions.

2. The method of claim 1, further comprising receiving the one or more interfering signals from at least one of the serving base station transmitting in a plurality of multiple input multiple output (MIMO) layers, or one or more non-serving base stations.

3. The method of claim 1, wherein identifying the one or more restrictions comprises determining the one or more restrictions from hardcoded information, receiving the one or more restrictions from an operator network configuration, or receiving the one or more restrictions in one or more signals from the serving base station.

4. The method of claim 1, wherein the one or more restrictions include a restriction on a periodicity used by one or more eNBs, transmitting the one or more interfering signals, for the one or more reference signal transmissions, and wherein detecting the one or more reference signal transmissions comprises detecting the one or more reference signal transmissions based on the periodicity.

5. The method of claim 4, wherein identifying the one or more restrictions comprises receiving an indication of the periodicity for the one or more reference signal transmissions.

6. The method of claim 4, wherein identifying the one or more restrictions includes receiving an indication of a number of possible periodicities for the one or more reference signal transmissions, and wherein detecting the one or more reference signal transmissions comprises determining the periodicity based at least in part on the number of possible periodicities and a plurality of previously detected reference signal transmissions.

7. The method of claim 4, wherein identifying the one or more restrictions comprises determining the periodicity based at least in part on determining an antenna port configuration.

8. The method of claim 1, wherein the one or more restrictions include a restriction on a number of antenna ports for the one or more reference signal transmissions, and wherein detecting the one or more reference signal transmissions comprises detecting the one or more reference signal transmissions based at least in part on an antenna port configuration corresponding to the number of antenna ports.

9. The method of claim 8, wherein identifying the one or more restrictions comprises receiving an indication of the antenna port configuration for the one or more reference signal transmissions.

10. The method of claim 8, wherein identifying the one or more restrictions includes receiving an indication of a number of antenna port configurations used for the one or more reference signal transmissions, and wherein detecting the one or more reference signal transmissions comprises determining the antenna port configuration used for the one or more reference signal transmissions based at least in part on the number of antenna port configurations and a plurality of previously detected reference signal transmissions.

11. The method of claim 8, wherein identifying the one or more restrictions comprises determining the antenna port configuration based at least in part on determining a periodicity to transmit the one or more reference signal transmissions.

12. The method of claim 1, wherein the one or more restrictions include a restriction on virtual cell identifiers related to the one or more reference signal transmissions, and wherein detecting the one or more reference signal transmissions comprises detecting the one or more reference signal transmissions based on the virtual cell identifiers.

13. The method of claim 12, wherein identifying the one or more restrictions comprises receiving an indication of the virtual cell identifiers or a range of the virtual cell identifiers related to the one or more reference signal transmissions, and wherein detecting the one or more reference signal transmissions comprises detecting the one or more reference signal transmissions based on the virtual cell identifiers.

14. The method of claim 12, wherein identifying the one or more restrictions comprises determining the virtual cell identifiers based at least in part on a rule associating one or more physical cell identifiers to the virtual cell identifiers.

15. The method of claim 1, wherein the one or more restrictions include a restriction on a number of reference signal transmissions in a period of time, and wherein detecting the one or more reference signal transmissions comprises detecting a plurality signals having similar properties, wherein a number of the one or more signals is equal to the restriction on the number of reference signal transmissions.

16. An apparatus for improving identification of reference signal transmissions at a user equipment (UE), comprising:
a memory; and
at least one processor coupled to the memory, and configured to:
identify one or more restrictions related to reference signal transmissions in one or more interfering signals;
detect, based at least in part on the one or more restrictions, one or more reference signal transmissions received in the one or more interfering signals; and
process the one or more reference signal transmissions received in the one or more interfering signals to improve communications with a serving base station by one or more of:
estimating a channel related to the one or more reference signal transmissions,
cancelling interference caused by the one or more reference signal transmissions to communications from the serving base station,
determining virtual cell identifiers of the one or more reference signal transmissions, or
determining resource element locations for rate matching using the one or more reference signal transmissions.

17. The apparatus of claim 16, further comprising a transceiver for receiving the one or more interfering signals from at least one of the serving base station transmitting in a plurality of multiple input multiple output (MIMO) layers, or one or more non-serving base stations.

18. The apparatus of claim 16, wherein the identifying the one or more restrictions is based at least in part on determining the one or more restrictions from hardcoded information, receiving the one or more restrictions in an operator network configuration, or receiving the one or more restrictions from the serving base station.

19. The apparatus of claim 16, wherein the one or more restrictions include a restriction on a periodicity used by one or more eNBs, transmitting the one or more interfering signals, for the one or more reference signal transmissions, and wherein the detecting the one or more reference signal transmissions is based at least in part on the periodicity.

20. The apparatus of claim 19, wherein the identifying the one or more restrictions is based at least in part by receiving an indication of the periodicity for the one or more reference signal transmissions.

21. The apparatus of claim 19, wherein the identifying the one or more restrictions is based at least in part on receiving an indication of a number of possible periodicities for the one or more reference signal transmissions, and wherein the at least one processor is further configured to determine the periodicity based at least in part on the number of possible periodicities and a plurality of previously detected reference signal transmissions.

22. The apparatus of claim 16, wherein the one or more restrictions include a restriction on a number of antenna ports for the one or more reference signal transmissions, and wherein the detecting the one or more reference signal transmissions is based at least in part on an antenna port configuration corresponding to the number of antenna ports.

23. The apparatus of claim 22, wherein the identifying the one or more restrictions is at least in part by receiving an indication of the antenna port configuration used by one or more eNBs.

24. The apparatus of claim 22, wherein the identifying the one or more restrictions is at least in part by receiving an indication of a number of antenna port configurations used by one or more eNBs, and wherein the at least one processor is further configured to determine the antenna port configuration used for the one or more reference signal transmissions based at least in part on the number of antenna port configurations and a plurality of previously detected reference signal transmissions.

25. The apparatus of claim 16, wherein the one or more restrictions include a restriction on virtual cell identifiers related to the one or more reference signal transmissions, and wherein the detecting the one or more reference signal transmissions is based on the virtual cell identifiers.

26. The apparatus of claim 16, wherein the one or more restrictions include a restriction on a number of reference signal transmissions in a period of time, and wherein the detecting the one or more reference signal transmissions is based at least in part on detecting a plurality signals received from one or more eNBs having similar properties, wherein a number of the one or more signals is equal to the restriction on the number of reference signal transmissions.

27. An apparatus for improving identification of reference signal transmissions at a user equipment (UE), comprising:
means for identifying one or more restrictions related to reference signal transmissions in one or more interfering signals;
means for detecting, based at least in part on the one or more restrictions, one or more reference signal transmissions received in the one or more interfering signals; and
means for processing the one or more reference signal transmissions received in the one or more interfering signals to improve communications with a serving base station by one or more of:
estimating a channel related to the one or more reference signal transmissions,
cancelling interference caused by the one or more reference signal transmissions to communications from the serving base station,
determining virtual cell identifiers of the one or more reference signal transmissions, or
determining resource element locations for rate matching using the one or more reference signal transmissions.

28. A non-transitory computer readable medium, for improving identification of reference signal transmissions at a user equipment (UE), comprising code for:
identifying one or more restrictions related to reference signal transmissions in one or more interfering signals;
detecting, based at least in part on the one or more restrictions, one or more reference signal transmissions received in the one or more interfering signals; and
processing the one or more reference signal transmissions received in the one or more interfering signals to improve communications with a serving base station by one or more of:
estimating a channel related to the one or more reference signal transmissions,
cancelling interference caused by the one or more reference signal transmissions to communications from the serving base station,
determining virtual cell identifiers of the one or more reference signal transmissions, or
determining resource element locations for rate matching using the one or more reference signal transmissions.

29. The apparatus of claim 27, further comprising means for receiving the one or more interfering signals from at least one of the serving base station transmitting in a plurality of multiple input multiple output (MIMO) layers, or one or more non-serving base stations.

30. The non-transitory computer readable medium of claim 28, further comprising code for receiving the one or more interfering signals from at least one of the serving base station transmitting in a plurality of multiple input multiple output (MIMO) layers, or one or more non-serving base stations.

* * * * *